United States Patent [19]

Kumozaki et al.

[11] Patent Number: 5,539,564
[45] Date of Patent: Jul. 23, 1996

[54] POINT-TO-MULTIPOINT OPTICAL TRANSMISSION SYSTEM

[75] Inventors: Kiyomi Kumozaki, Zushi; Seiichi Yamano; Noriki Miki, both of Yokosuka; Ryuichi Watanabe, Zushi; Shinichi Aoyagi, Tokyo; Yasuyuki Okumura, Yokosuka; Yoshihiro Takigawa, Yokohama, all of Japan

[73] Assignee: Nippon Telegraph and Telephone Corporation, Tokyo, Japan

[21] Appl. No.: 308,498

[22] Filed: Sep. 21, 1994

[30] Foreign Application Priority Data

| Sep. 22, 1993 | [JP] | Japan | 5-236897 |
| Mar. 8, 1994 | [JP] | Japan | 6-037235 |
| Jun. 8, 1994 | [JP] | Japan | 6-126620 |
| Jun. 15, 1994 | [JP] | Japan | 6-133456 |
| Jun. 22, 1994 | [JP] | Japan | 6-140562 |

[51] Int. Cl.$^6$ .......................... H04B 10/12; H04B 10/20
[52] U.S. Cl. .......................... 359/161; 359/137; 359/153
[58] Field of Search .................. 359/110, 117, 359/125, 133, 137, 139, 152, 153, 161, 167

[56] References Cited

U.S. PATENT DOCUMENTS

| 4,878,049 | 10/1989 | Ochiai | 359/110 |
| 5,069,521 | 12/1991 | Hardnick | 359/110 |
| 5,121,244 | 6/1992 | Takasaki | 359/161 |
| 5,229,875 | 7/1993 | Glista | 359/110 |
| 5,357,360 | 10/1994 | Imhoff | 359/110 |

FOREIGN PATENT DOCUMENTS

| 58-62949 | 4/1983 | Japan . | |
| 0169134 | 7/1988 | Japan | 359/153 |
| 0086340 | 3/1990 | Japan | 359/153 |
| 0244919 | 9/1990 | Japan | 359/110 |
| 0098331 | 4/1991 | Japan | 359/153 |

OTHER PUBLICATIONS

Fiber–Optic Subscriber Systems for Narrowband Services, Kenji OKADA et al, NTT R&D vol. 42, No. 7, pp. 857–868 (1993).

*Primary Examiner*—Leslie Pascal
*Attorney, Agent, or Firm*—Finnegan, Henderson, Farabow, Garrett & Dunner

[57] ABSTRACT

A point-to-multipoint communication system is presented to enable a reliable, high quality communication using multiplexed optical signals between a central office equipment and a plurality of subscriber's equipment. The system is provided with a plurality of office transceivers in the central office equipment, and the each of the subscribers is provided with at least one subscriber transceiver. The system is designed so that a redundancy system is built-in by providing one of either the office transceivers, a plurality of subscriber's transceivers or the optical connection device, to connect the two sets of transceivers at all times. One of these redundancy systems provides an operating connection between each of the office transmitters which are connected to the office transceivers and each of the subscriber transmitters which are connected to the subscriber transceivers. Therefore, when a malfunction occurs somewhere in the optical network, the least number of the malfunctioning components need to be switched over the the normally functioning system to maintain continued communication services. The present communication system is designed with the least number of active components, therefore, the failure probability is significantly decreased, and repairs if necessary can be preformed quickly. The overall effect of the present system is that interactive point-to-multipoint communication services of high quality and reliability are provided at reasonable cost.

13 Claims, 26 Drawing Sheets

FIG. 5

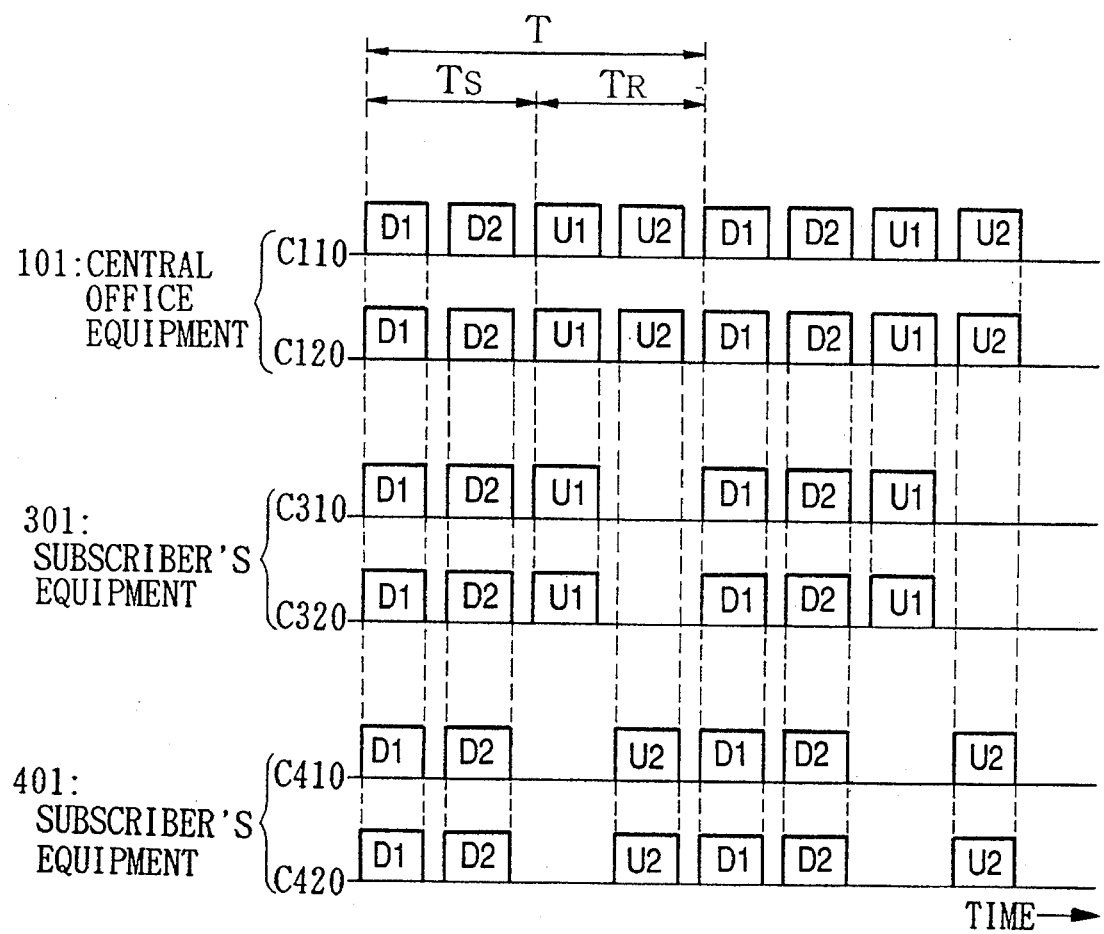

T : SIGNAL SENDING/RECEIVING REPETITION PERIOD
Ts : BROADCASTING PERIOD
TR : SIGNAL RACEIVING PERIOD
D1 : SIGNAL FROM CENTRAL OFFICE EQUIPMENT 101 TO SUBSCRIBER'S EQUIPMENT 301
D2 : SIGNAL FROM CENTRAL OFFICE EQUIPMENT 101 TO SUBSCRIBER'S EQUIPMENT 401
U1 : SIGNAL FROM SUBSCRIBER'S EQUIPMENT 301 TO CENTRAL OFFICE EQUIPMENT 101
U2 : SIGNAL FROM SUBSCRIBER'S EQUIPMENT 401 TO CENTRAL OFFICE EQUIPMENT 101

S : TRANSMITTER
R : RECEIVER
S E L : SELECTION SECTION

FIG.12

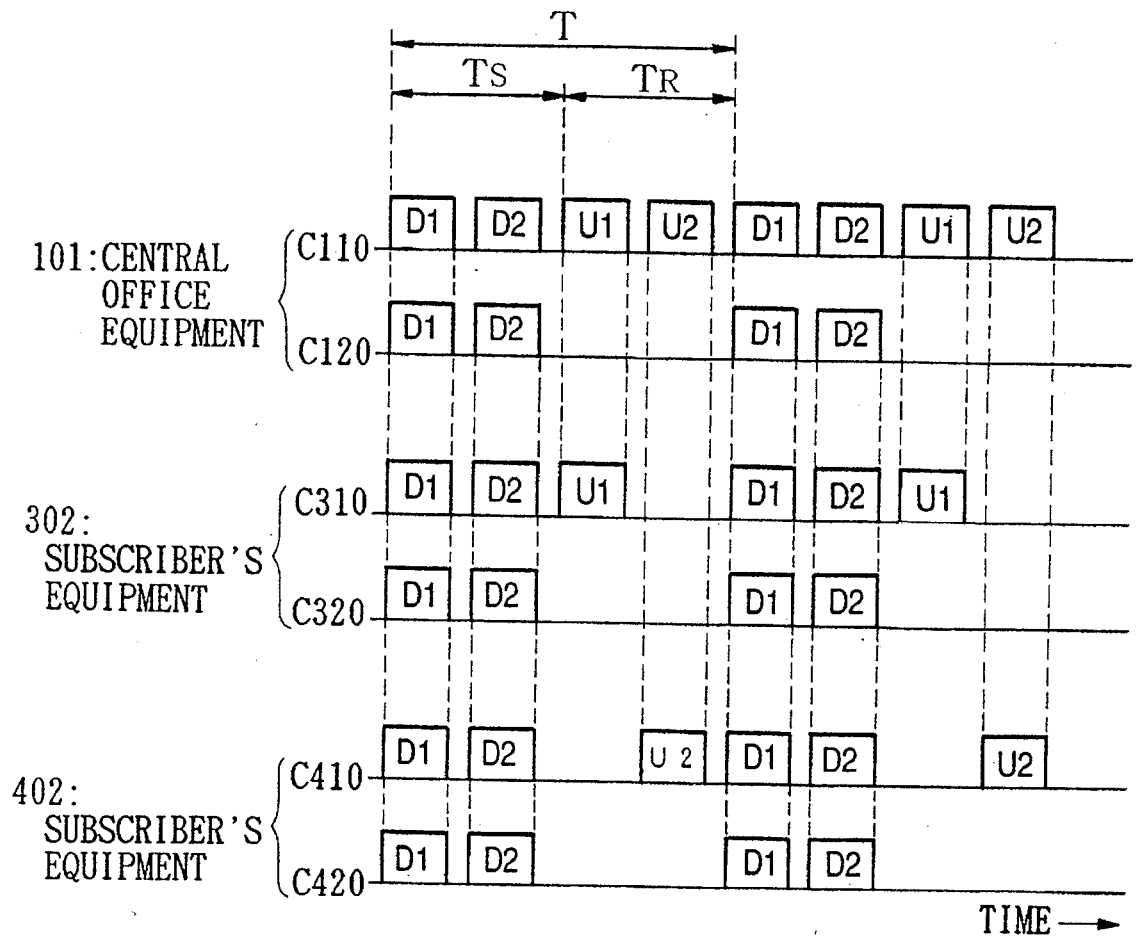

- T : SIGNAL SENDING/RECEIVING REPETITION PERIOD
- $T_S$ : BROADCASTING PERIOD
- $T_R$ : SIGNAL RACEIVING PERIOD
- D 1 : SIGNAL FROM CENTRAL OFFICE EQUIPMENT 101 TO SUBSCRIBER'S EQUIPMENT 302
- D 2 : SIGNAL FROM CENTRAL OFFICE EQUIPMENT 101 TO SUBSCRIBER'S EQUIPMENT 402
- U 1 : SIGNAL FROM SUBSCRIBER'S EQUIPMENT 302 TO CENTRAL OFFICE EQUIPMENT 101
- U 2 : SIGNAL FROM SUBSCRIBER'S EQUIPMENT 402 TO CENTRAL OFFICE EQUIPMENT 101

FIG.14

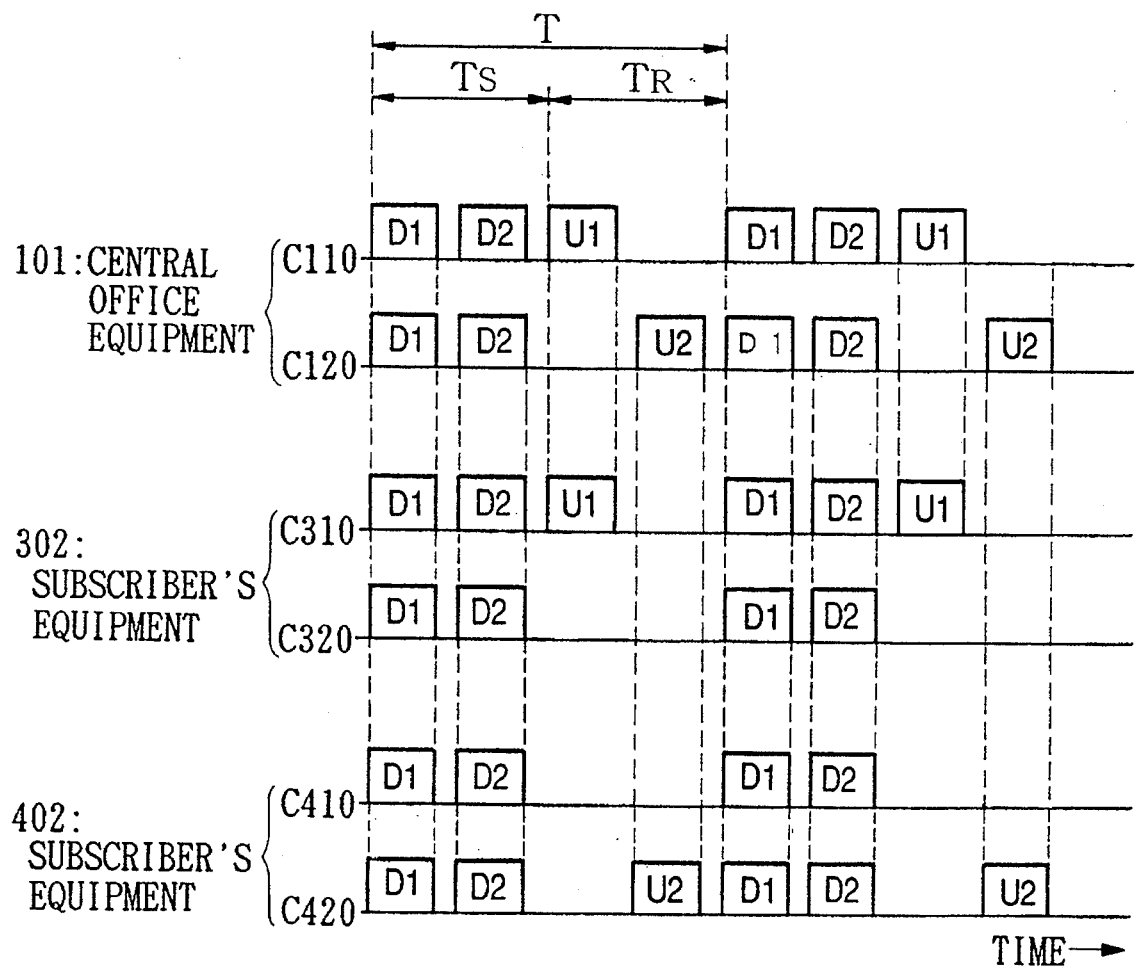

- T : SIGNAL SENDING/RECEIVING REPETITION PERIOD
- Ts : BROADCASTING PERIOD
- TR : SIGNAL RACEIVING PERIOD
- D 1 : SIGNAL FROM CENTRAL OFFICE EQUIPMENT 101 TO SUBSCRIBER'S EQUIPMENT 302
- D 2 : SIGNAL FROM CENTRAL OFFICE EQUIPMENT 101 TO SUBSCRIBER'S EQUIPMENT 402
- U 1 : SIGNAL FROM SUBSCRIBER'S EQUIPMENT 302 TO CENTRAL OFFICE EQUIPMENT 101
- U 2 : SIGNAL FROM SUBSCRIBER'S EQUIPMENT 402 TO CENTRAL OFFICE EQUIPMENT 101

FIG. 16

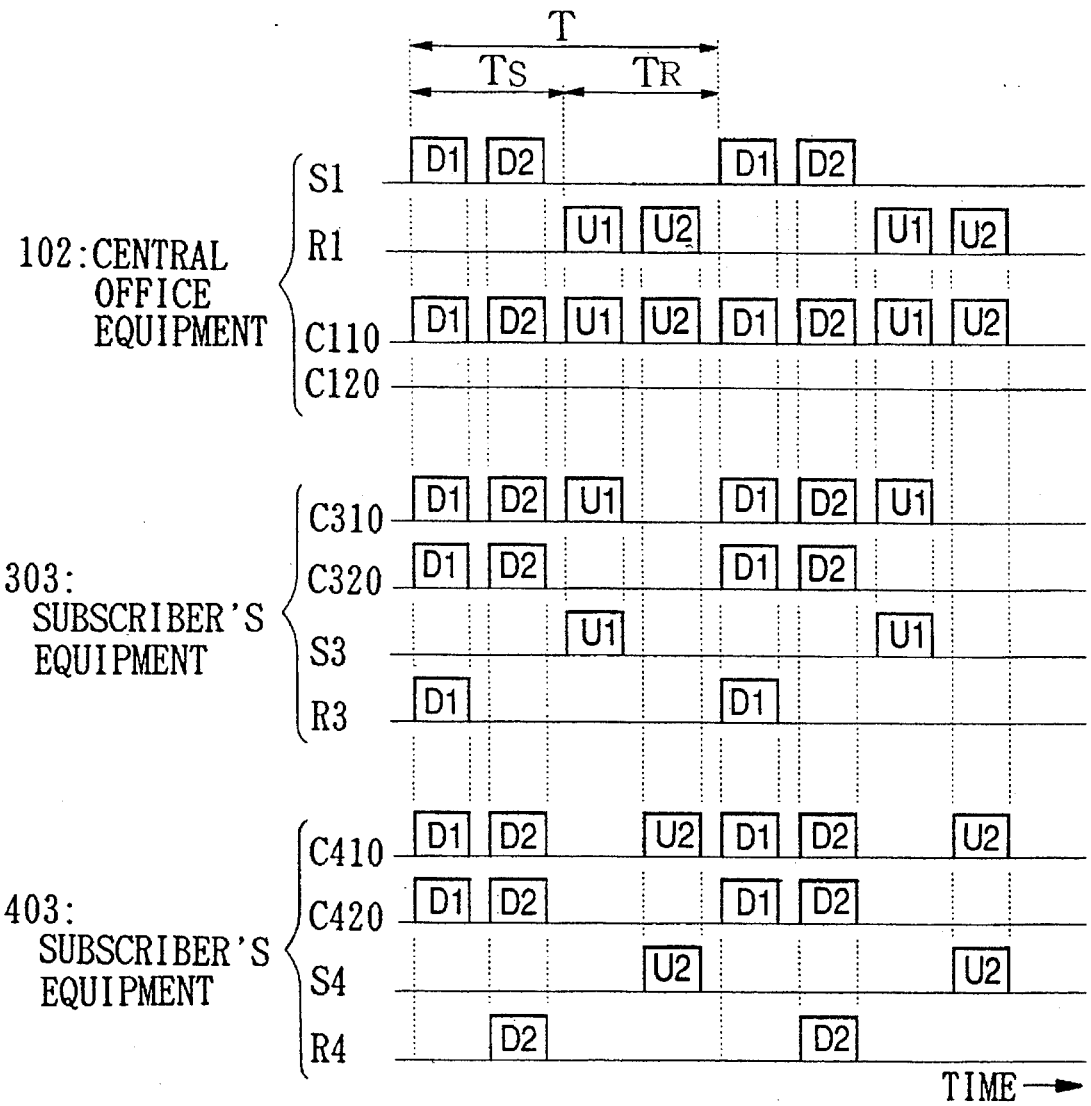

- T : SIGNAL SENDING/RECEIVING REPETITION PERIOD
- Ts : BROADCASTING PERIOD
- TR : SIGNAL RACEIVING PERIOD
- D 1 : SIGNAL FROM CENTRAL OFFICE EQUIPMENT 102 TO SUBSCRIBER'S EQUIPMENT 303
- D 2 : SIGNAL FROM CENTRAL OFFICE EQUIPMENT 102 TO SUBSCRIBER'S EQUIPMENT 403
- U 1 : SIGNAL FROM SUBSCRIBER'S EQUIPMENT 303 TO CENTRAL OFFICE EQUIPMENT 102
- U 2 : SIGNAL FROM SUBSCRIBER'S EQUIPMENT 403 TO CENTRAL OFFICE EQUIPMENT 102

FIG. 17

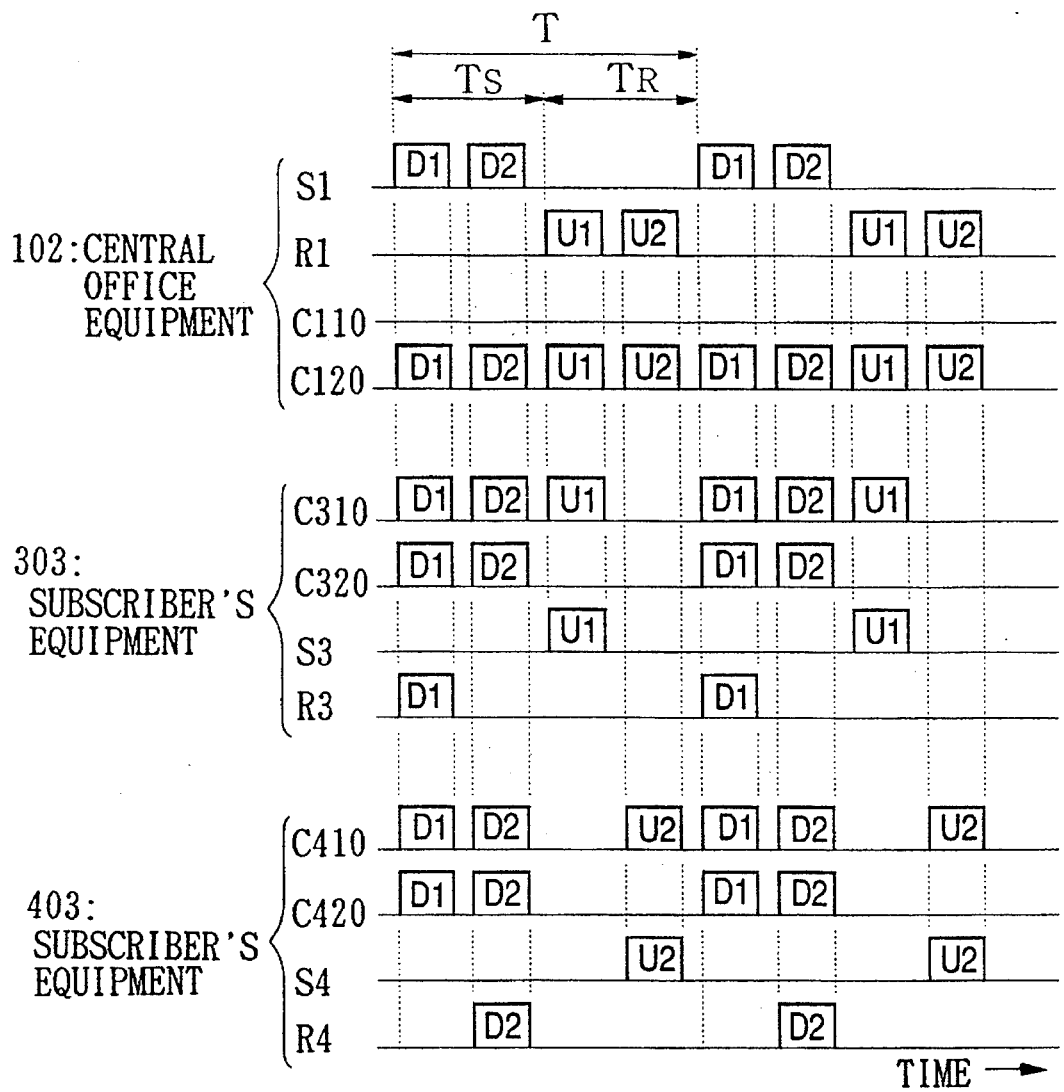

T : SIGNAL SENDING/RECEIVING REPETITION PERIOD
Ts : BROADCASTING PERIOD
TR : SIGNAL RACEIVING PERIOD
D1 : SIGNAL FROM CENTRAL OFFICE EQUIPMENT 102 TO SUBSCRIBER'S EQUIPMENT 303
D2 : SIGNAL FROM CENTRAL OFFICE EQUIPMENT 102 TO SUBSCRIBER'S EQUIPMENT 403
U1 : SIGNAL FROM SUBSCRIBER'S EQUIPMENT 303 TO CENTRAL OFFICE EQUIPMENT 102
U2 : SIGNAL FROM SUBSCRIBER'S EQUIPMENT 403 TO CENTRAL OFFICE EQUIPMENT 102

FIG.18

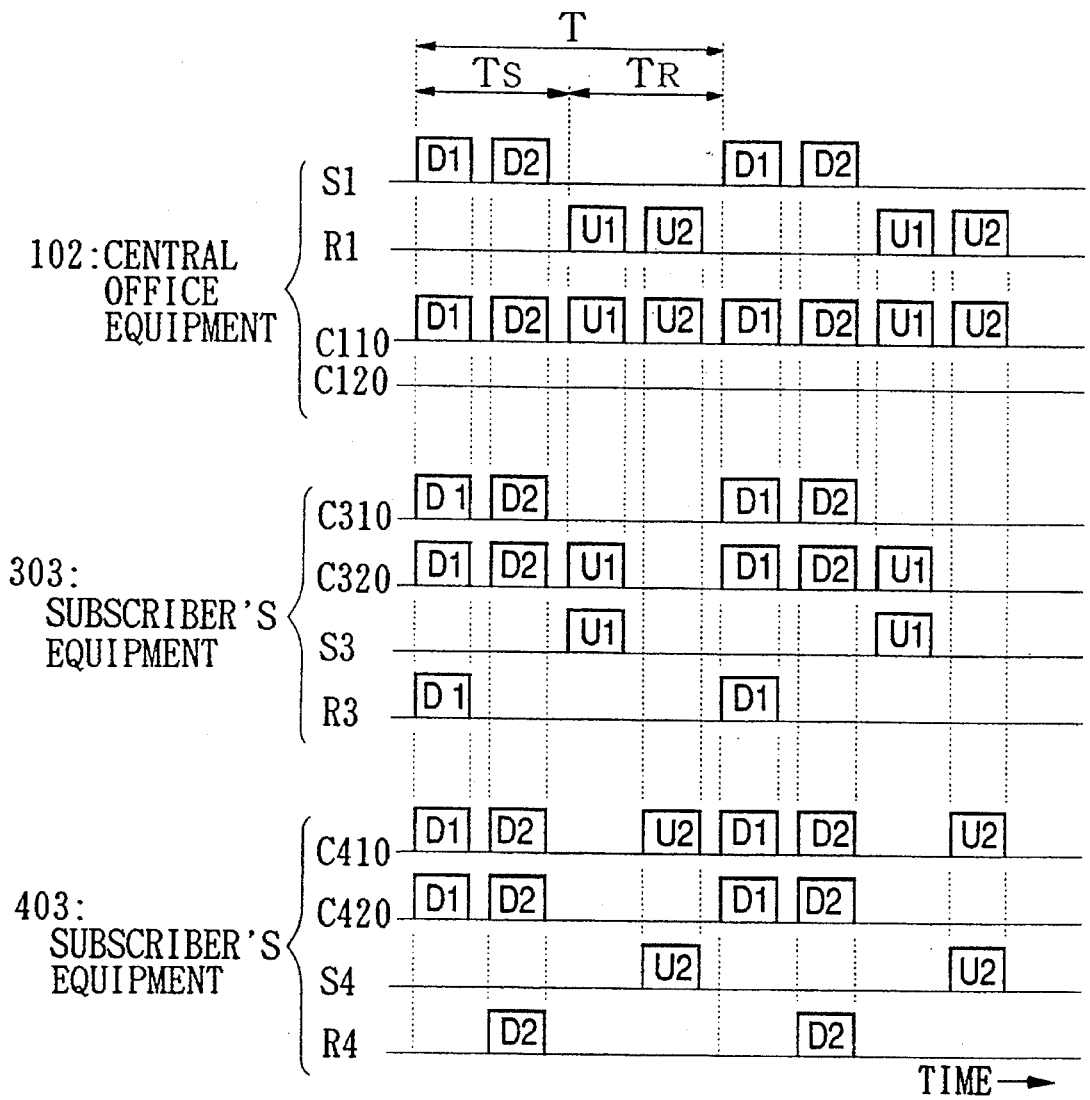

- T : SIGNAL SENDING/RECEIVING REPETITION PERIOD
- Ts : BROADCASTING PERIOD
- TR : SIGNAL RACEIVING PERIOD
- D 1 : SIGNAL FROM CENTRAL OFFICE EQUIPMENT 102 TO SUBSCRIBER'S EQUIPMENT 303
- D 2 : SIGNAL FROM CENTRAL OFFICE EQUIPMENT 102 TO SUBSCRIBER'S EQUIPMENT 403
- U 1 : SIGNAL FROM SUBSCRIBER'S EQUIPMENT 303 TO CENTRAL OFFICE EQUIPMENT 102
- U 2 : SIGNAL FROM SUBSCRIBER'S EQUIPMENT 403 TO CENTRAL OFFICE EQUIPMENT 102

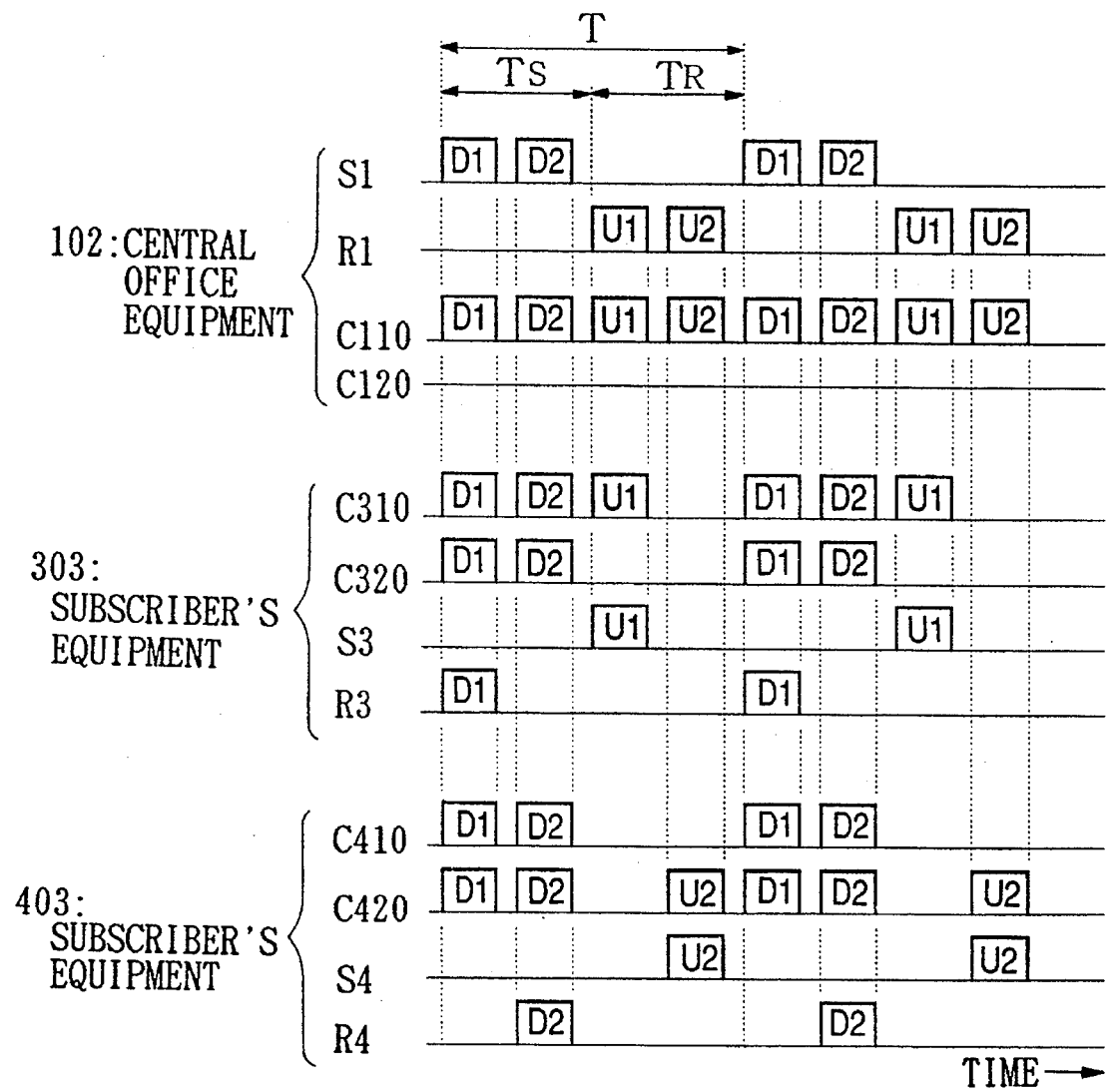

FIG.19

- T : SIGNAL SENDING/RECEIVING REPETITION PERIOD
- Ts : BROADCASTING PERIOD
- TR : SIGNAL RACEIVING PERIOD
- D1 : SIGNAL FROM CENTRAL OFFICE EQUIPMENT 102 TO SUBSCRIBER'S EQUIPMENT 303
- D2 : SIGNAL FROM CENTRAL OFFICE EQUIPMENT 102 TO SUBSCRIBER'S EQUIPMENT 403
- U1 : SIGNAL FROM SUBSCRIBER'S EQUIPMENT 303 TO CENTRAL OFFICE EQUIPMENT 102
- U2 : SIGNAL FROM SUBSCRIBER'S EQUIPMENT 403 TO CENTRAL OFFICE EQUIPMENT 102

S : TRANSMITTER
R : RECEIVER

FIG.25 (PRIOR ART)

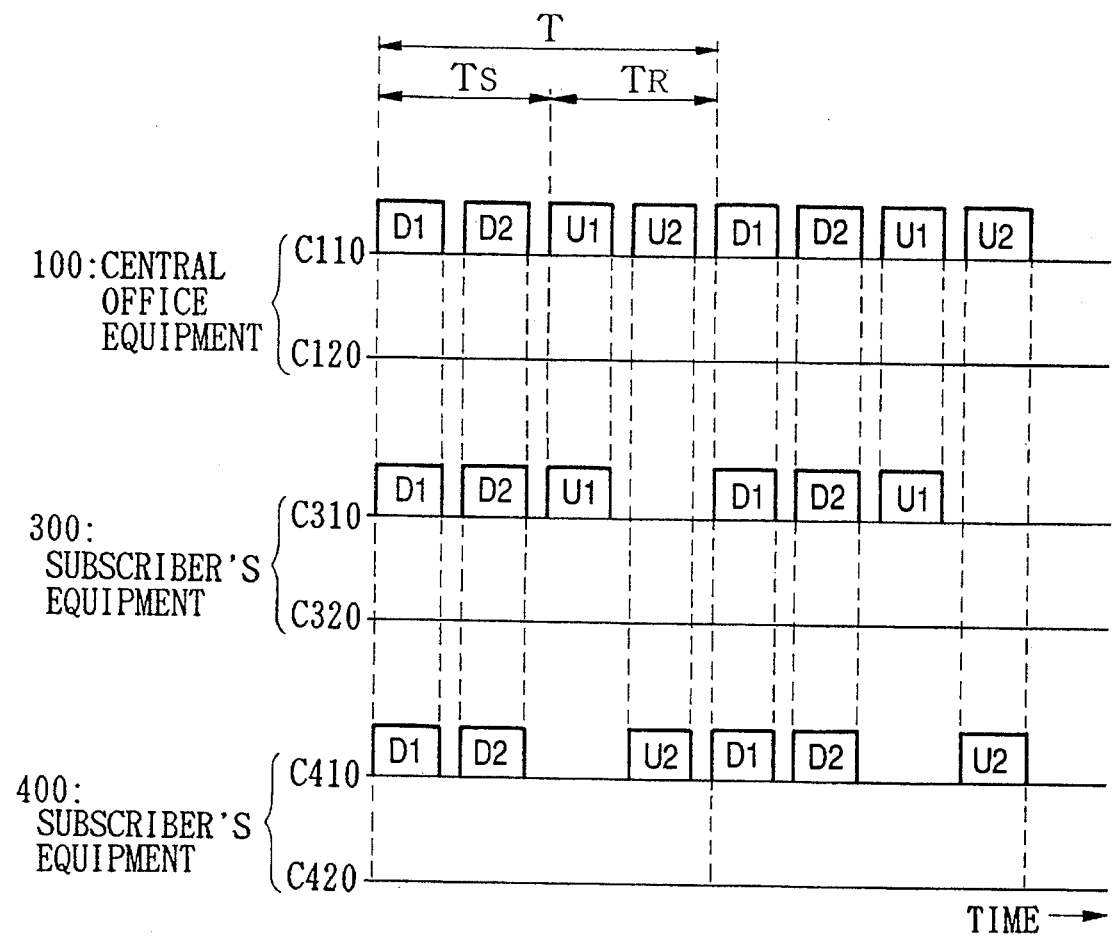

T : SIGNAL SENDING/RECEIVING REPETITION PERIOD
Ts : BROADCASTING PERIOD
TR : SIGNAL RACEIVING PERIOD
D1 : SIGNAL FROM CENTRAL OFFICE EQUIPMENT 100 TO SUBSCRIBER'S EQUIPMENT 300
D2 : SIGNAL FROM CENTRAL OFFICE EQUIPMENT 100 TO SUBSCRIBER'S EQUIPMENT 400
U1 : SIGNAL FROM SUBSCRIBER'S EQUIPMENT 300 TO CENTRAL OFFICE EQUIPMENT 100
U2 : SIGNAL FROM SUBSCRIBER'S EQUIPMENT 400 TO CENTRAL OFFICE EQUIPMENT 100

FIG.26 (PRIOR ART)

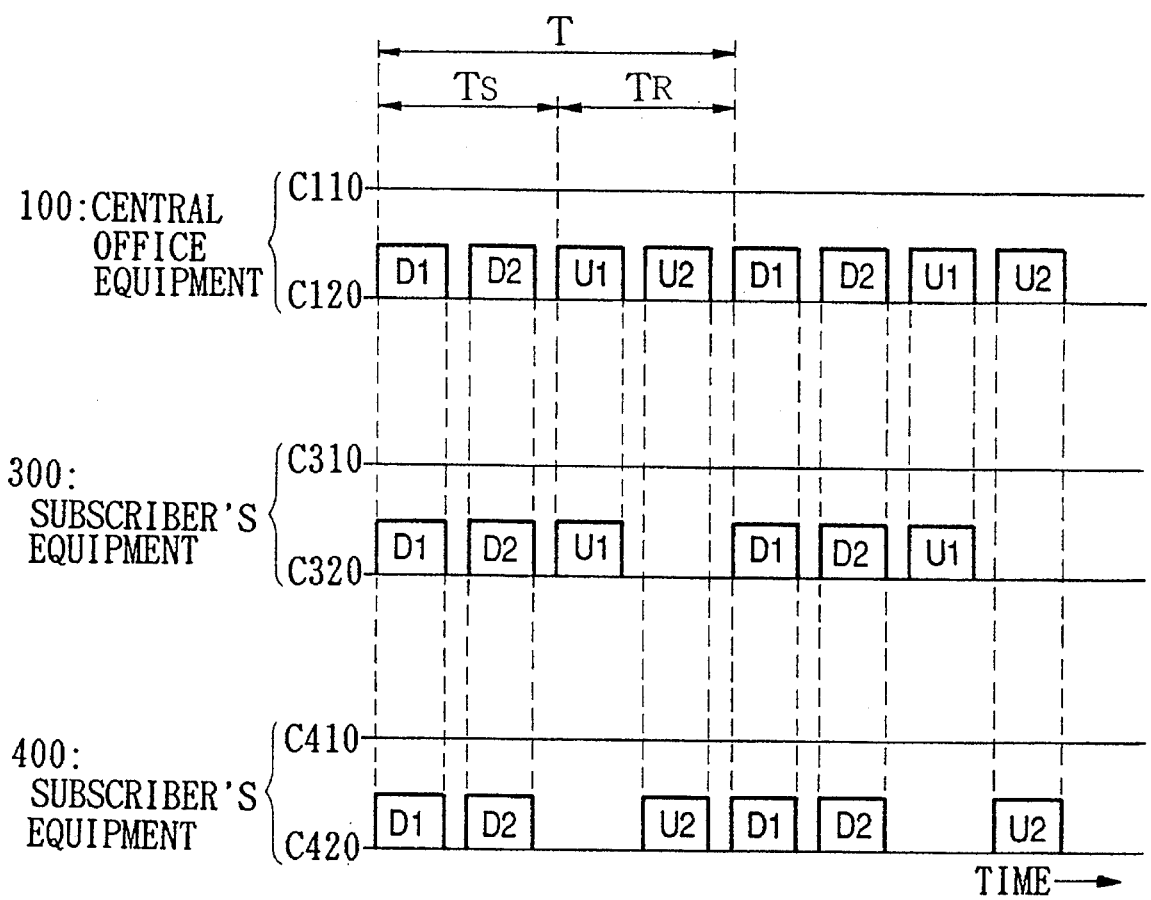

T : SIGNAL SENDING/RECEIVING REPETITION PERIOD
Ts : BROADCASTING PERIOD
TR : SIGNAL RACEIVING PERIOD
D 1 : SIGNAL FROM CENTRAL OFFICE EQUIPMENT 100 TO
 SUBSCRIBER'S EQUIPMENT 300
D 2 : SIGNAL FROM CENTRAL OFFICE EQUIPMENT 100
 TO SUBSCRIBER'S EQUIPMENT 400
U 1 : SIGNAL FROM SUBSCRIBER'S EQUIPMENT 300 TO
 CENTRAL OFFICE EQUIPMENT 100
U 2 : SIGNAL FROM SUBSCRIBER'S EQUIPMENT 400 TO
 CENTRAL OFFICE EQUIPMENT 100

POINT-TO-MULTIPOINT OPTICAL TRANSMISSION SYSTEM

BACKGROUND OF THE INVENTION

1. Field of the Invention

The present invention relates to a point-to-multipoint optical communication system to enable one transmission equipment at the central office to interactively communicate with a plurality of transceiver equipment at the subscriber premises.

2. Technical Background

There have been many R & D activities to develop point-to-multipoint optical communication systems in which one communication equipment at the central office can interactively communicate with a plurality of subscriber's equipment which are connected through branched optical paths to the central office equipment. A known example of such a system is a passive double star (PDS) system.

In the PDS system, branching of optical path lines is carried out by using an optical star coupler. The optical star coupler is a passive device which optically connects one optical fiber at the central office with any number (an integer) of subscriber's optical fibers, and performs the functions of optically merging subscriber's optical signal (referred to as upstreaming signals, or U-signals hereinbelow) and outputting the merged optical signal towards the central office. The optical star coupler also performs the functions of separating the optical signals from the central office equipment into the plurality of subscriber's optical fibers, and broadcasting the separated signals (referred to as downstreaming signals, or D-signals) to individual subscriber's equipment.

The PDS subscriber system will be explained with reference to FIGS. 21 and 22.

(A) PDS System using unidirectional star coupler

FIG. 21 is a schematic illustration of the basic configuration of the PDS subscriber system using a set of unidirectional star couplers. To simplify the presentation, there are shown only two subscriber's equipment, however, it is quite possible to increase this number to any number of subscriber's equipment.

In this system, the set of star couplers 210a, 210b is disposed at a branching point in the optical path line to optically connect the central office equipment 100 with two subscriber's equipment 300, 400. Here, the star coupler 210a is an optical merger for merging the upstreaming signals, and optically connects the optical signal receiver 112 of the optical signal transceiver 110 at the central office with the optical signal transmitter 311 of the transceiver section 310 of the subscriber's equipment 300 and with the optical signal transmitter 411 of the transceiver section 410 of the subscriber's equipment 400. The optical star coupler 210b is an optical signal splitter for branching the downstreaming signals, and optically connects the optical signal transmitter 111 of the transceiver 110 at the central office with the optical signal receiver 312 of the transceiver section 310 of the subscriber's equipment 300 and with the optical signal receiver 412 of the transceiver section 410 of the subscriber's equipment 400.

In the above PDS system, prior to starting communication operation, propagation delay times, between the central office equipment 100 and each of the subscriber's equipment 300, 400, are measured, and commands are issued to prepare both of the equipment 300, 400 for signal transmission timing and data capacity for signal reception/transmission so as to avoid collisions of U-signals and superimposition of U-signals with the D-signals. The subscriber's equipment 300, 400 output U-signals at the requested transmission timing, and the U-signals are passively multiplexed by the optical merger 210a, and at the signal reception point of central office equipment 100, the U-signals from the equipment 300, 400 are arranged in time sequence. In the meantime, the D-signals forwarded from the central office equipment 100 to the subscriber's equipment 300, 400 are time division multiplexed, branched at the optical star coupler (optical splitter) 210b and are forwarded to the subscriber's equipment 300, 400. The subscriber's equipment 300, 400 select those signals which are addressed to itself from the time division multiplexed D-signals arranged on a time sequence.

(B) PDS System using bidirectional star coupler

FIG. 22 is a schematic illustration of the interactive PDS system using a bidirectional star coupler. In this illustration, the number of subscriber's equipment shown is limited to two for simplicity. This type of PDS system enables communication with a single line network by multiplexing both U- and D-signals. In this case, the optical star coupler 210 functions as an optical merger/splitter device. The methods of multiplexing the U- and D-signals can be divided into wavelength division multiplexing (WDM) method which assigns different wavelengths to each U- and D-signals, and time compression multiplexing (TCM) method which multiplexes the U- and D-signals on a specific time space.

In the PDS systems shown in FIGS. 21 and 22, to decrease the probability of generating communication problems, such as line breakdown and frequent bit errors, a method is known to duplicate the optical communication system comprising signal path lines, transmitting and receiving sections. FIG. 23 illustrates a case of duplicating the PDS system based on the configuration shown in FIG. 21, and FIG. 24 illustrates a case of duplicating the PDS system based on the configuration shown in FIG. 22.

Since the systems shown in FIGS. 23 and 24 are based on the same approach to duplicity, and it will suffice to explain the duplicating system on the basis of the PDS system shown in FIG. 24. In these illustrations, the system of bidirectional multiplexing is illustrated with a case involving one central office equipment and two subscriber's equipment, for simplicity.

As shown in FIG. 24, the central office equipment 100 and the subscriber's equipment 300, 400 respectively utilize optical fibers 200, 201 and 202, for the equipment 300, and optical fibers 220, 221 and 222 for the equipment 400. In each path line of the subscriber's equipment 300, 400, there are provided optical couplers 210, 230, respectively, for branching the D-signals to the subscriber's equipment 300, 400, and for coupling the U-signals to the central office equipment 100. The optical couplers 210, 230 are bidirectional optical couplers. In the following presentations, the system components including signal transceivers 110, 310, 410, optical fibers 201, 202, optical couplers 210, and optical fiber 200 will be referred to as the 0th path, and the system components including signal transceivers 120, 320, 420, optical fibers 221, 222, optical coupler 230 and optical fiber 220 will be referred to as the 1st path.

The central office equipment 100 comprises: a dual line transceivers 110, 120 for communicating with the subscriber's equipment 300, 400; a switching member 130 for switching the D-signal inputted from an input port S1; a switching member 140 for switching the U-signal to be forwarded to an output port R1.

The subscriber's equipment 300 comprises: a dual line transceiver sections 310, 320 for communicating with the central office equipment 100; a switching member 330 for switching the U-signals inputted from an input port S3; a switching member 340 for switching the D-signal to be forwarded to an output port R3.

Similarly, the subscriber's equipment 400 comprises: a dual line transceiver sections 410, 420 for communicating with the central office equipment 100; a switching member 430 for switching the U-signal inputted from an input port S4 (signal input); a switching member 440 for switching the D-signal to be forwarded to a receiving port R4 (signal output).

In the central office equipment 100, the transceiver 110 is optically connected to the transceiver 310 of the subscriber's equipment 300, and to the transceiver 410 of the subscriber's equipment 400, via optical fibers 200, 201 and 202, respectively. An optical coupler 210 is provided in the optical fiber 200 at the branching point to the subscriber's equipment 300, 400 so as to split or merge the U- and D-signals.

Similarly, the transceiver 120 is optically connected to the transceiver 320 of the subscriber's equipment 300, and to the transceiver 420 of the subscriber's equipment 400, via optical fibers 220, 221 and 222, respectively. An optical coupler 230 is provided in the optical fiber 220 at the branching point to the subscriber's equipment 300, 400 so as to split or merge the U- and D-signals.

Normally, the switching members 130, 140 of the central office equipment 100; the switching members 330, 340 of the subscriber's equipment 300; and the switching members 430, 440 of the subscriber's equipment 400 are all joined in the 0th path (the side labelled "a" in the switching members in FIG. 24). By this arrangement, the transceiver 110 is optically connected to the corresponding transceivers 310, 410, thus enabling optical communications via optical fiber 200, 201 and 202. In this case, it is possible to cease operation of the transceivers 120, 320 and 420 in the unused 1st path. It is of course desirable, from the viewpoint of conservation of power, that the unnecessary operations should be made to cease.

If a problem develops in any one of the transceivers 110, 310 and 410, or in any one of optical fibers 200, 201, 202 and optical coupler 210, the switching members 130, 140, 330, 340, 430 and 440 are all switched to the 1st path (the side labelled "b" in the switching members in FIG. 24). When the system is so switched, the transceiver 120 of the central office equipment 100 is connected to correspond with the transceivers 320, 420, and communication is carried out via optical fibers 220, 221 and 222.

Next, the operation of the system of the above construction will be explained with reference to a communication diagram shown in FIG. 25. This diagram relates to a case of the time division multiplexing method for multiplexing the subscriber signals, as well as for bidirectional multiplexing of U- and D-signals in accordance with the duplicate PDS system shown in FIG. 24.

In FIG. 24, the switching members 130, 140, 330, 340, 430 and 440 are all set on the "a" side in FIG. 24, signifying that the active system is the 0th path.

As shown FIG. 25, during the first half signal sending (broadcasting) period $T_S$ of a sending/receiving repetition period T, a D-signal D1 to the subscriber's equipment 300 and a D-signal D2 to the subscriber's equipment 400 are forwarded from the central office transceiver 110 and received by the subscriber's equipment 300, 400 in the following sequence.

Step 1
Signals D1, D2 are inputted into the input port S1 of the central office equipment 100 shown in FIG. 24, and are supplied to the transceiver 110 via switching member 130.

Step 2
Signals D1, D2 are converted to optical signals in the transmitter 111 of the transceiver 110, and are outputted to optical fiber 200 from the I/O port C110 via the optical coupler 113.

Step 3
Signals D1, D2 are branched by the optical coupler 210, and are supplied to the I/O port C310 of the subscriber's equipment 300, and to the I/O port C410 of the subscriber's equipment 400 via the respective optical fibers 201, 202.

Step 4
Signals D1, D2 are received by the signal transceiver 310 of the subscriber's equipment 300, and are branched by the optical coupler 313, are converted into electrical signals in the receiver 312, and signal D1 addressed to the subscriber's equipment 300 is discriminated, and is outputted to the I/O port R3 via the switching member 340.

Similarly, in the transceiver 410 of the subscriber's equipment 400, signals D1, D2 are branched by the optical coupler 413, converted into electrical signals in the receiver 412, and signal D2 addressed to itself is discriminated, and is outputted to the I/O port R4.

Next, during the latter half signal receiving period $T_R$ of the signal sending/receiving repetition period T, a U-signal U1 from the subscriber's equipment 300, and a U-signal U2 from the subscriber's equipment 400 are forwarded to the central office equipment 100 in the following sequence.

Step 5
Signal U1 is inputted into the input port S3 of the subscriber's equipment 300 shown in FIG. 24, and is supplied to the transceiver 310 via the switching member 330. In the transceiver 310, signal U1 is converted into optical signal by the transmitter 311, and is outputted from the I/O port C310 to optical fiber 201 via the optical coupler 313.

Similarly, signal U2 is inputted into the input port S4 of the subscriber's equipment 400, and is supplied to the transceiver 410 via the switching member 430. In the transceiver 410, signal U2 is converted into optical signal by the transmitter 411, and is outputted from the I/O port C410 to optical fiber 202 via the optical coupler 413.

In this case, to prevent the signals U1 and U2 from superimpose upon each other, they are outputted at predetermined time positions, i.e. time division multiplexed.

Step 6
Signals U1, U2 forwarded to the respective optical fibers 201, 202 are coupled in the optical coupler 210, and are supplied to the I/O port C110 of the central office equipment 100 via optical fiber 200.

Step 7
Signals received in the transceiver 110 of the central office equipment 100 are branched at the optical coupler 113, photo-electric converted by the receiver 112, and are outputted to I/O port R1 via switching member 140.

The above seven steps are repeated for each signal sending/receiving repetition period T.

For simplicity, such components as synchronizing frame for synchronizing signal sending/receiving, control channels for transmission timing assignment and switching operations in the subscriber's equipment and propagation delay time in the optical fibers are omitted from FIG. 25.

If there is any fear of developing problem in any one of the components such as the transceivers 110, 310, 410, optical fibers 200, 201, 202 and optical coupler 210, and it is deemed necessary to prevent degradation in the communication quality or shut down of a line, and to continue to provide high quality service, the system in use is changed from 0th to the 1st path.

In practice, if repairs are necessary to the optical fibers 200 while communication is being carried out using the 0th path, it will be necessary to switch the system from the 0th to the 1st path to maintain the continuity of reliable service. In such a case, all the switching members 130, 140, 330, 340, 430 and 440 are all switched to the "b" side shown in this figure, thus making the 1st path active.

FIG. 26 is a communication diagram in the case presented above. The communication operation is carried out as before the switching, by exchanging U- and D-signals between the transceiver 120 at the central office equipment 100 and the transceivers 320 and 420 on the subscriber's equipment 300, 400 via the optical fibers 220, 221 and 222.

After the switching operation, repairs can be made to any of the transceivers 110, 310, 410, optical fibers 200, 201, 202 and the optical coupler 210. The result is shortening of the down time, and improvement in reliability of service.

In the dual PDS system shown in FIG. 24, the two systems, the 0th path (comprising the transceiver 110 at the central office equipment 100, the transceiver 310 at the subscriber's equipment 300, the transceiver 410 at the subscriber's equipment 400, optical fibers 200, 201, 202 and the optical coupler 210) and the 1st path (comprising the transceiver 120 at the central office equipment 100, the transceiver 320 at the subscriber's equipment 300, the transceiver 420 at subscriber's equipment 400, optical fibers 220, 221, 222 and the optical coupler 230) are switched all at once by means of the switching members 130, 140 at the central office equipment 100, the switching members 330, 340 at the subscriber's equipment 300, the switching members 430, 440 at the subscriber's equipment 400.

After switching the systems over from one to the other, it is possible to save power by turning off the transceivers 310, 410 thereby shutting down the 0th path.

In such a dual PDS system, there are many components for constituting one optical path, and there is low probability that the switching operation will bring normal operation, because there is no assurance that all the components in the subscriber's equipment are operating normally. In the case of an example shown in FIG. 24, only two subscriber's equipment were shown for simplicity, but in actuality, there are many subscriber's equipment, and this probability drops even further. In other words, when there are many subscriber's equipment, even if the operating system is switched from one path to the other path, it is likely that the problem is still present somewhere in one or more components in the other optical path.

The result is that there is even a possibility that the normally operating path becomes dysfunctional by switching the the optical path. The disadvantage of this type of system is therefore, particularly severe in the case of one central office equipment serving many subscriber's equipment, thus making it difficult to offer highly reliable service. Also, the system configuration is such that switching is carried out for all the branches when a problem develops in one path, with the problem that there were frequent system shutdowns, and that the transmission quality suffered because of the attendant momentary interruptions.

The dual PDS system shown in FIG. 24 is a redundancy type in which two sets of transceivers are provided. In practice, however, it is possible to utilize a system having no redundancy at the subscriber's equipment. For example, if the user values high reliability of service, a redundancy type of system is provided while if the user values economy, a system having no redundancy is provided.

FIG. 27 shows an example of adding a subscriber's equipment 500 which has no redundancy to the dual PDS system shown in FIG. 24. As shown in this figure, the subscriber's equipment 500 has one transceiver 520, and the input terminal of the transmitter 521 of the transceiver 520 is connected to the input port S5, and the output terminal of the receiver 522 of the transceiver 520 is connected to the output port R5. Also, the transmitter 521 and the receiver 522 are connected to the optical coupler 230 via the optical coupler 523 and optical fiber 205. In other words, the transceiver 520 is a part of the 1st path.

In such a network configuration, if the 1st path is active, the subscriber's equipment 500 is able to communicate with the central office equipment 100, but if a problem develops in the 1st path, only the 0th path becomes active, and the subscriber's equipment 500 having no redundancy will become dysfunctional. That is, this type of system suffers from a disadvantage that a subscriber having no redundancy is unable to receive any communication service when the system is switched over from the 1st to the 0th path.

If the problem lies in its own equipment (for example, transceiver 520, optical fiber 205 etc.), an interruption in service may be accepted as a natural result of having placed importance on economy rather than reliability. However, the fundamental problem in the design of this type of system is that an interruption can brought about by problems existing in an equipment other than his own.

It is of course possible to mandate the use of redundancy in all subscriber's equipment, however, such a system will be costly, and the user's share of the cost becomes also high. Those subscribers who decided to opt for non-redundancy did so because of the economical attraction of the system, and if the cost of subscription becomes as high as that for a system having redundancy, it can be expected that the number of such existing and potential users will be greatly diminished. The end result is that the basic meaning of having options will be nullified for the subscribers.

As summarized above, reliable service is difficult to achieve using the conventional dual PDS system presented above, and those subscribers having no redundancy was subjected to interruptions in communication service even when the problem is not his own making.

SUMMARY OF THE INVENTION

An objective of the present invention is to present an interactive multiplexed communication system providing point-to-multipoint communication services in an optical network, in which a subscriber having no redundancy system in its local facility can continue to receive interactive communication services of high quality and reliability, in case of a local system failure elsewhere in the optical network.

The above objective is achieved with a communication system comprising: a central office communication means having: a plurality of office transceiver means for sending and receiving optical signals; and office selection means for selecting an optical signal of higher quality among a plurality of optical signals received in the transceiver means; a plurality of subscriber communication means having: a plurality of subscriber transceiver means for sending and receiving optical signals oppositely associated with the central office communication means; and subscriber selection means for selecting one transceiver means among the plurality of transceiver means; a plurality of office signal path means, each path means comprising an office end and an opposing subscriber end, for providing optical paths in the optical network, wherein the office end optically connected to each of the plurality of transceiver means in the central office communication means; a plurality of subscriber signal path means, each path means comprising a subscriber end and an opposing office end, for providing optical paths in the optical network, wherein the subscriber end optically connected to each of the plurality of transceiver means of the plurality of subscriber communication means; a plurality of optical connection means for making or breaking optical connection between the subscriber end of the plurality of office signal path means and the office end of the plurality of subscriber signal path means; wherein at least one of the central office communication means, the plurality of subscriber communication means or the plurality of optical connection means is configured so that connection means for optically connecting the office signal path means with each of the plurality of subscriber signal path means is maintained when a problem is generated in an optical path means of any optical path means in the optical network.

According to the communication system presented above, the system is designed so that at all times one of either the central office communication equipment or a plurality of subscribers equipment or optical connection device optically connect each of the plurality of central office optical fibers to each of the subscriber optical fibers. Therefore, each of the plurality of office transceivers is optically connected at all times to any one of the transceivers in the plurality of subscriber communication equipment. Therefore, a plurality of redundancy is built-in in the optical network of the present system. Such a network system is able to provide uninterrupted interactive communication services even when a local problem develops within the network, by switching the least number of system components from the operating optical paths over to a stand-by redundancy paths. The present system avoids the problem of momentary interruptions experienced in the conventional system in case of local system failure.

The present communication system is designed with the least number of active components, therefore, the probability that the switched over optical path is non-functional is significantly decreased, and the overall effect of the present system is that interactive point-to-multipoint communication services of high quality and reliability are provided at reasonable cost.

BRIEF DESCRIPTION OF THE DRAWINGS

FIG. 5 is a transmission/reception diagram in the fourth embodiment.

FIG. 12 is a transmission/reception diagram in the fifth embodiment.

FIG. 14 is a transmission/reception diagram in the fifth embodiment.

FIG. 16 is a transmission/reception diagram in the sixth embodiment.

FIG. 17 is another transmission/reception diagram in the sixth embodiment.

FIG. 18 is another transmission/reception diagram in the sixth embodiment.

FIG. 19 is another transmission/reception diagram in the sixth embodiment.

FIG. 25 is a transmission/reception diagram for the dual PDS system shown in FIG. 24.

FIG. 26 is an example of the transmission/reception diagram when the 1st path becomes active.

PREFERRED EMBODIMENTS OF THE INVENTION

Preferred embodiments of the present invention will be presented below with reference to the drawings.

First Embodiment

Figure 1:
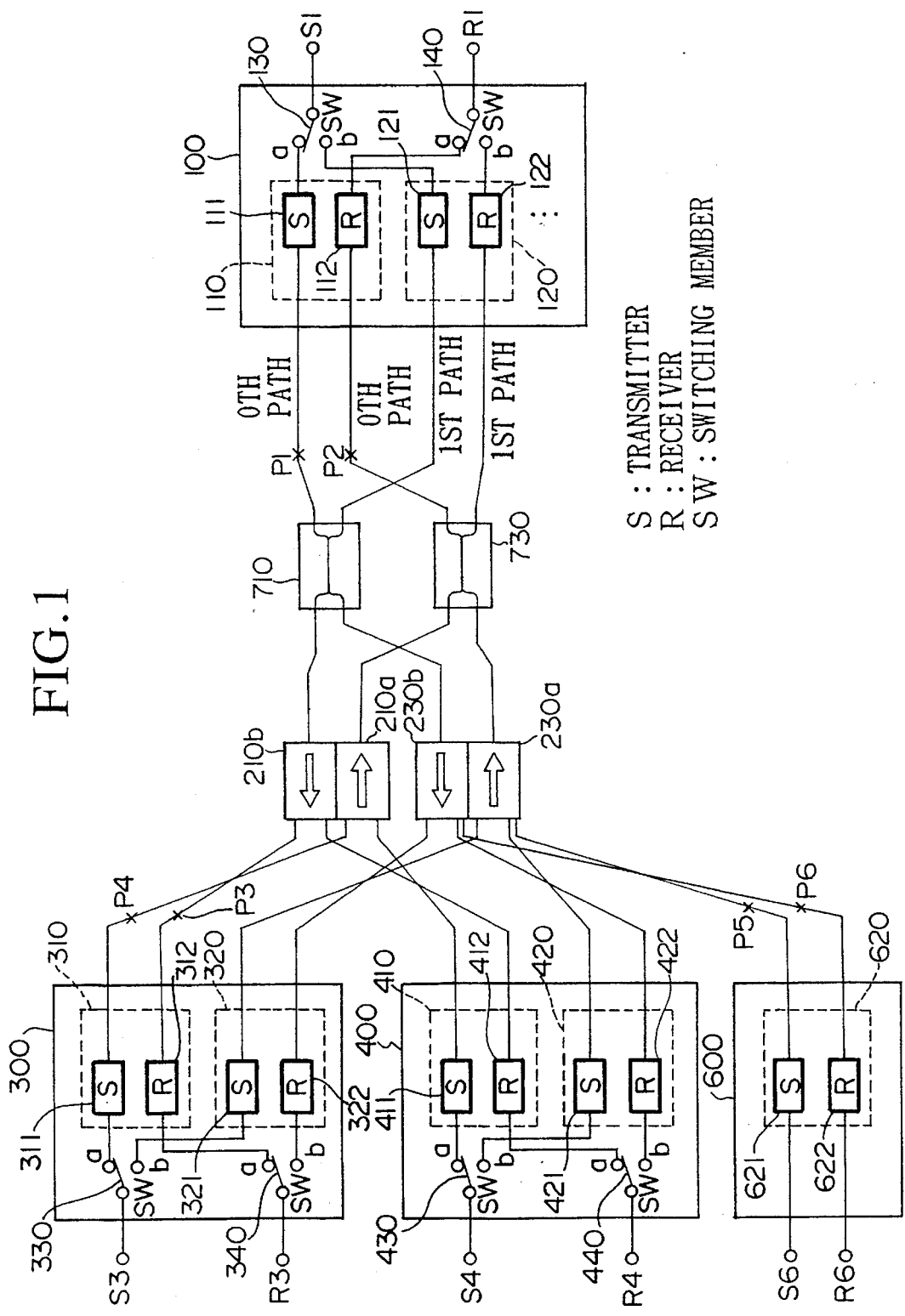
FIG. 1 is a block diagram of a first embodiment of a point-to-multipoint optical transmission system of this invention.
Figure 23:
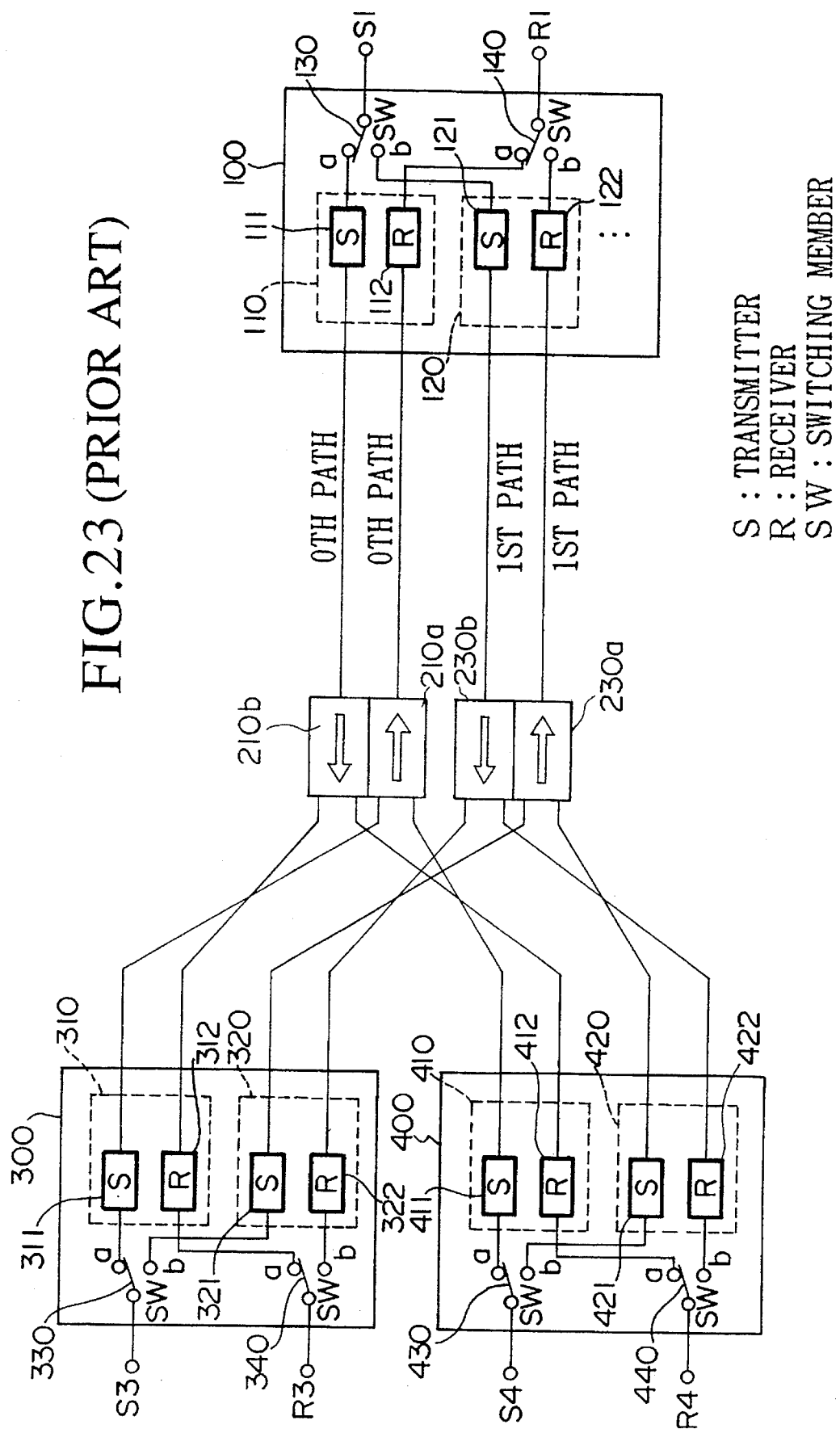
FIG. 23 is a PDS system shown in FIG. 21 having dual optical paths.

FIG. 1 is a block diagram for a first embodiment of the interactive optical system offering point-to-multipoint communication services. For simplicity, the embodiment is explained in terms of one central office equipment and three subscriber's equipment. In FIG. 1, those parts which are common to FIG. 23 are given the same reference numerals, and their explanations are omitted.

In FIG. 1, the central office equipment 100 comprises a transceiver 110 in the 0th path having a transmitter 111 and a receiver 112 and a transceiver 120 in the 1st path having a transmitter 121 and a receiver 122. The subscriber's equipment 300 comprises a transceiver 310 in the 0th path having a transmitter 311 and a receiver 312 and a transceiver 320 in the 1st path having a transmitter 321 and a receiver 322. The subscriber's equipment 400 includes a transceiver 410 in the 0th path having a transmitter 411 and a receiver 412 and a transceiver 420 in the 1st path having a transmitter 421 and a receiver 422. The subscriber's equipment 600 includes a transceiver 610 having a transmitter 621 and a receiver 622.

The couplers used are unidirectional star couplers 210a, 210b, 230a, 230b described earlier. The coupler 210a functions as an optical merger which merges the U-signals in the 0th path from the transmitter 311 of the subscriber's equipment 300 with U-signals from the transmitter 411 of the subscriber's equipment 400, and forwards the merged signal to the central office. The optical coupler 210b functions as an optical splitter, and divides the D-signals transmitted from the transmitter 111 of the central office equipment 100, and forwards the split signals to the receiver 312 of the subscriber's equipment 300 and to the receiver 412 of the subscriber's equipment 400.

The optical coupler 230a functions as an optical merger, and merges the signals transmitted in the 1st path from the transmitter 321 of the subscriber's equipment 300, the transmitter 421 of the subscriber's equipment 400, and the transmitter 621 of the subscriber's equipment 600, and forwards the merged signal to the central office. The optical coupler 230b divides the D-signal from the transmitter 121 of the central office equipment 100, and forwards the divided signals to the receiver 322 of the subscriber's equipment 300, the receiver 422 of the subscriber's equipment 400 and the receiver 622 of the subscriber's equipment 600.

A feature of this embodiment is that optical couplers 710, 730 are inserted between the central office equipment 100 and the optical couplers 210a, 210b, 230a and 230b, and optically connected the subscriber's equipment 600, which is not provided with a redundancy system, to the optical couplers 230a and 230b. It is also permissible to optically connect the equipment 600 to the optical couplers 210a and 210b.

The optical coupler 710 functions as a mutual connection device for connecting two optical fibers, connected to the upstream side of the optical couplers 210b, 230b, with the transmitters 111, 112 of the central office equipment 100. The coupler 710 merges the D-signals from the transmitter 111 in the 0th path with the D-signals from the transmitter 121 in the 1st path, and after splitting the merged signal into two signals, forwards the split signals to each of the optical coupler 210b and 230b. The optical coupler 730 is also a mutual connection device for connecting two optical fibers from the optical couplers 210a, 230a with the receivers 112, 122 of the central office equipment 100, and its function is to merge the signals outputted from the two sets of optical couplers 210a, 230a, and after splitting the merged signal into two signals, to forward the split signals to each of the receiver 112 in the 0th path and the receiver 122 in the 1st path.

Let us assume that the 0th path is active, and the 1st path is a reserve. Therefore, the transmitter 111 in the 0th path of the central office equipment 100 will be generating the broadcast signals. The D-signals (or broadcast signals) are received in the receivers 312, 322 of the equipment 300 and in the receivers 412, 422 of the equipment 400 via the optical couplers 710, 210b and 230b. The signal reception function is being carried out by the receivers 312, 412 in the active 0th path.

The D-signals are also received by the receiver 622 of the equipment 600 via the optical couplers 710, 230b. On the other hand, the output signals in the 0th path from the transmitter 311 of the equipment 300, the transmitter 411 of the equipment 400, and the transmitter 621 of the equipment 600 are received in the receivers 112, 122 of the central office equipment 100 via the optical couplers 210a, 230a and 730. The signal reception is carried out by the receiver 112 in the active 0th path.

In the situation presented above, the transmitters 321, 421 in the 1st path of the respective equipment 300, 400 are normally non-functional. It is of course possible to configure to operate the reserve 1st path in parallel with the active 0th path, however, it is necessary to time multiplex to prevent the signals in the 1st path from affecting the signals in the active 0th path.

The following is an explanation of the switching operation when a problem develops somewhere at points P1 to P6 in the network shown in FIG. 1 when the office communication equipment 100 and the subscriber's equipment 300, 400 are in operation through the 0th optical path.

When the line is cut-off at point P1, input ceases to all the equipment 300, 400, 600. Accordingly, the transmitters 311, 411 and 621 cease outputting signals, and the system sends warning signals to the central office equipment 100. In response, the central office equipment 100 switches the active system from 0th to the 1st path. In this case, the 0th path can be placed in a standby mode, but in this embodiment, it is left in the operational mode.

When the line is cut-off at point P2, the receiver 112 of the central office equipment 100 ceases to accept all input signals from the equipment 300, 400 and 600. Accordingly, the central office equipment 100 switches the system from the active 0th path to the 1st path. The 0th path is left in the operational mode.

When the line is cut-off at point P3, only the receiver 312 in the 0th path of the equipment 300 becomes dysfunctional. Accordingly, the equipment 300 ceases outputting signals from the transmitter 311 in the 0th path of the equipment 300, and sends warning signal to the central office equipment 100, after which, it switches from the 0th path to the 1st path. It should be noted that line failure at point P1 will also cause the the receiver 312 to stop operating. Therefore, the switching operation at the equipment 300 should be performed after confirming that the central office equipment 100 has not performed the switching operation. To assure this protocol, this embodiment provides means, such as a timer, for choosing a switching time at the subscriber's equipment 300 only after a lapse of a preset period, subsequent to the system failure, to confirm that the central office equipment 100 has not switched over the path.

Other protocols include, for example, a case in which the central office equipment 100, having received warning signals, issues a command signal to equipment 300 to switch over to the 1st path. Upon receiving the command signal at the receiver 322 in the 1st path, the operating system is switched over to the 1st path. In the equipment 100, 400, and 600, the 0th path is left in the operational mode.

When the line is cut-off at point P4, the receiver 112 in the 0th path of the central office equipment 100 detects that the input from the equipment 300 has been cutoff. Accordingly, the central office equipment 100 issues a command signal to equipment 300 to switch over from the 0th to the 1st path. This command signal is received by either the receiver 312 in the 0th path or the receiver 322 in the 1st path at the equipment 300, and the switching operation is performed. The 0th path remain in the operational mode in the equipment 100, 400 and 600.

The procedure described above for the line cutoff in the equipment 300 applies equally well to line failures occurring in equipment 400, and the switching operation is performed within the path of equipment 400.

When the line is cut-off at point P5, communication ceases totally at equipment 600, because this equipment is not provided with a redundant system. When the line is cut-off at point P6, the central office equipment 100 detects that input signals from the equipment 600 has been cut off however, since the equipment 600 has no redundant system, the equipment 100 is unable to continue communication. When line failures occur at point P5 or P6, the 0th path remains in the operational mode in equipment 100, 300 and 400, in other words, no switching operation is performed.

The above cases related to the failure of the optical paths, but if a failure occurs in other regions of the system which are common to the subscriber's equipment 300, 400 and 600, the same procedure as that used for the case of point P1, P2 is applicable. If a failure occurs within the path of the individual equipment 300, 400 and 600, the same procedure as that used for the case of point P3 to P6 is applicable. According to the network configuration presented in this embodiment, it is possible to perform switching operation individually within the path of the failure problem. Therefore, when the failure is restricted to within one part of the network, the switching operation affects only the local path, and there is no generation of momentary interruptions in the communication network linking other subscribers. Therefore, the network configuration of this embodiment enables maintenance of high quality communication services by preventing momentary interruptions.

The constitutional components of the switching embodiment are fewer in comparison to the conventional switching systems, and system failures caused by local problems in the subscriber's equipment can be lessened, thereby enabling to provide high quality communication services. Furthermore, the optical path system as a whole need not be switched over from one system to another, therefore, the network configuration of this embodiment enables to provide high quality and reliable communication services even to a subscriber who does not have a redundancy system, so long as his local system is free of problems.

Second Embodiment

Figure 2:
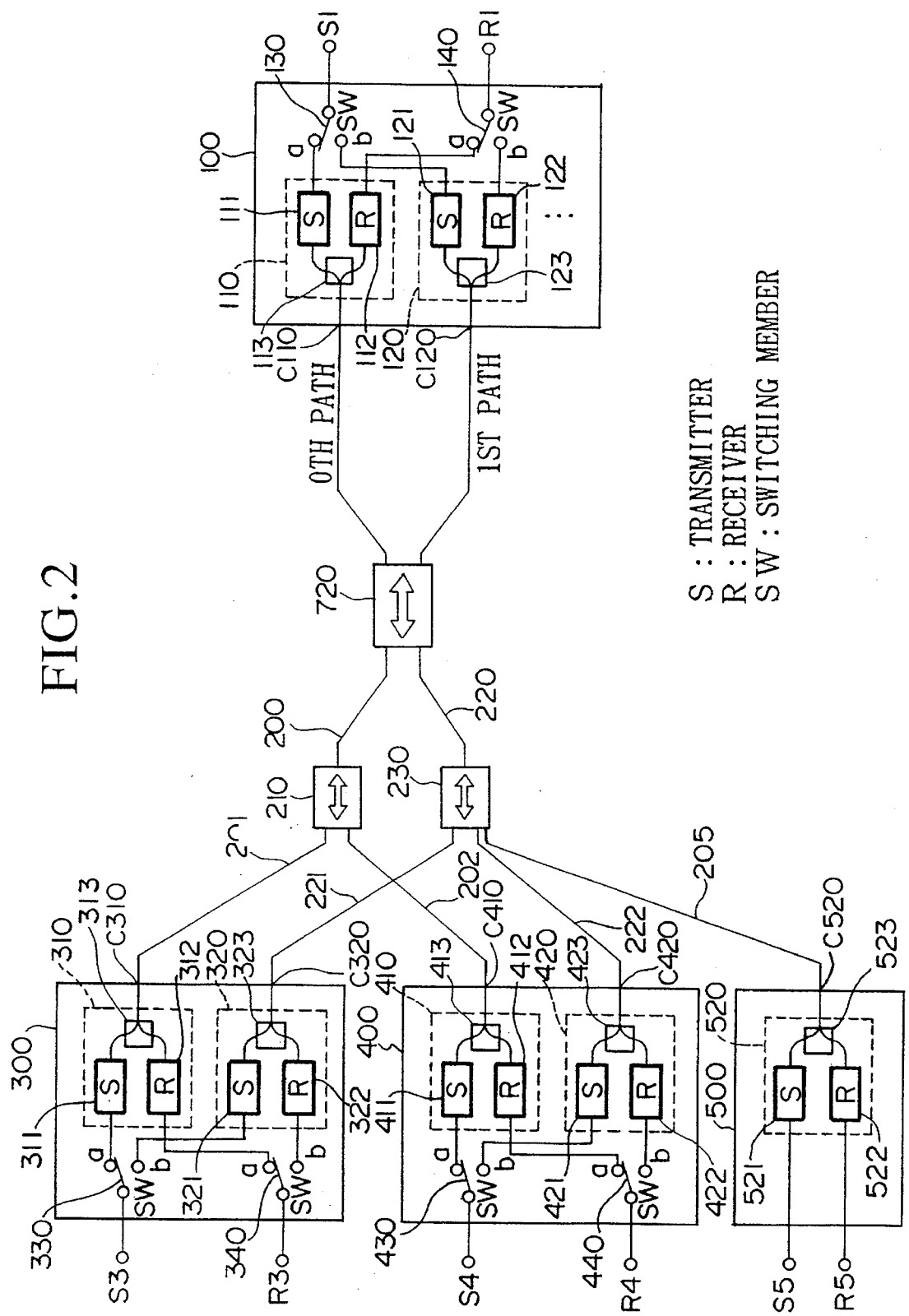
FIG. 2 is a block diagram of a second embodiment of point-to-multipoint optical transmission system.

A second embodiment of the point-to-multipoint optical system offering multiplexed communication services is presented in FIG. 2. This embodiment also relates to a case of interactive communication system having a central office and three subscribers. In FIG. 2, those parts which are common to the system shown in FIGS. 1 and 27 are given the same reference numerals.

Figure 24:
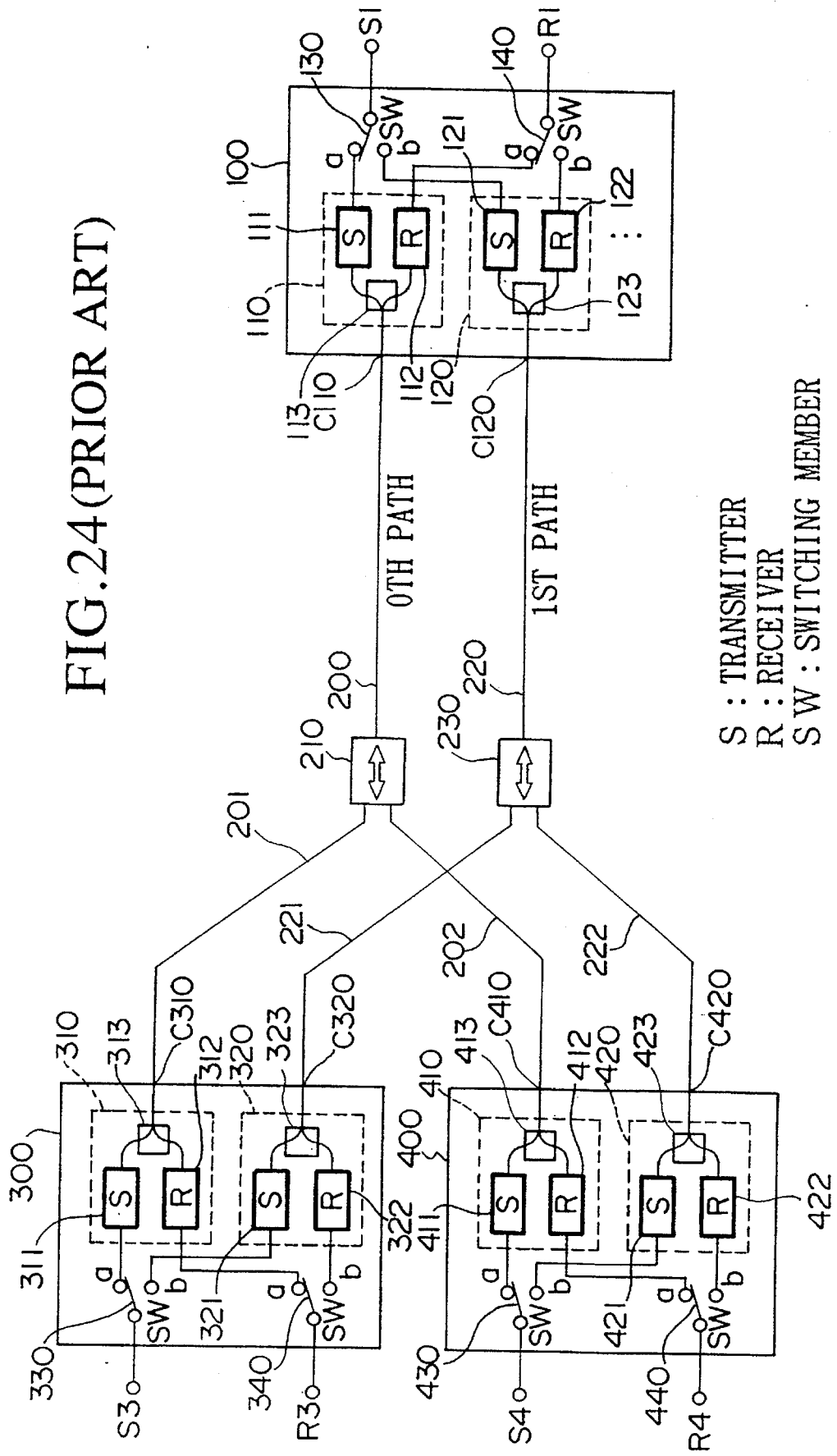
FIG. 24 is a PDS system shown in FIG. 22 having dual optical paths.
Figure 27:
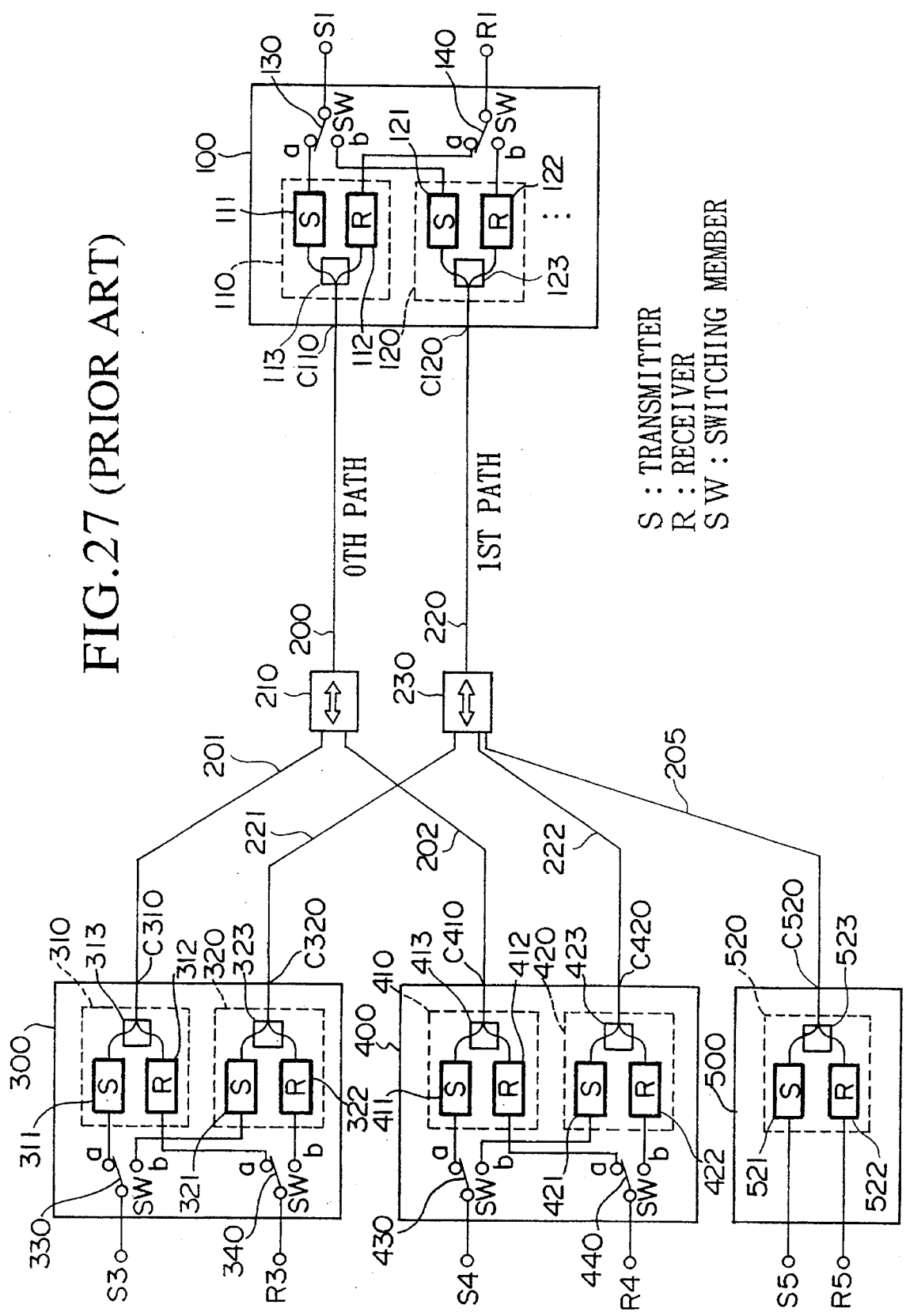
FIG. 27 is a case of adding a subscriber's equipment 500 having no redundancy.

The difference between the first and second embodiment is that the system shown in FIG. 1 corresponds to the system configuration shown in FIG. 23, while the system shown in FIG. 2 corresponds to that shown in either FIG. 24 or 27. In other words, in the point-to-multipoint communication network of this embodiment, the U-signals and D-signals are multiplexed, Accordingly, the optical couplers 210, 230 shown in FIG. 2 correspond to optical couplers 210*a*, 210*b*, 230*a* and 230*b* shown in FIG. 1, and function as an optical merger/splitter. The optical couplers 710, 730 shown in FIG. 1 have been replaced with an integral optical coupler 720.

In this embodiment, the switching procedures applied in the first embodiment to the failures at point P1, P2; P3, P4; and P5, P6 are applied simultaneously. It should be noted that the optical couplers 720, 210 and 230 can be replaced with an integrated star coupler provided that the reliability of optical connections therebetween can be assured. The remaining parts of the network is the same as that in the first embodiment, and their explanation will be omitted.

According to this embodiment also, the probability of generating momentary interruptions can be lowered as in the first embodiment, thereby providing high quality optical communication services. Furthermore, the optical path system as a whole need not be switched over from one system to another, therefore, the network configuration of this embodiment enables to provide high quality and reliable communication services even to a subscriber who does not have a redundancy system, so long as his local system is free of problems.

Third Embodiment

Figure 3:
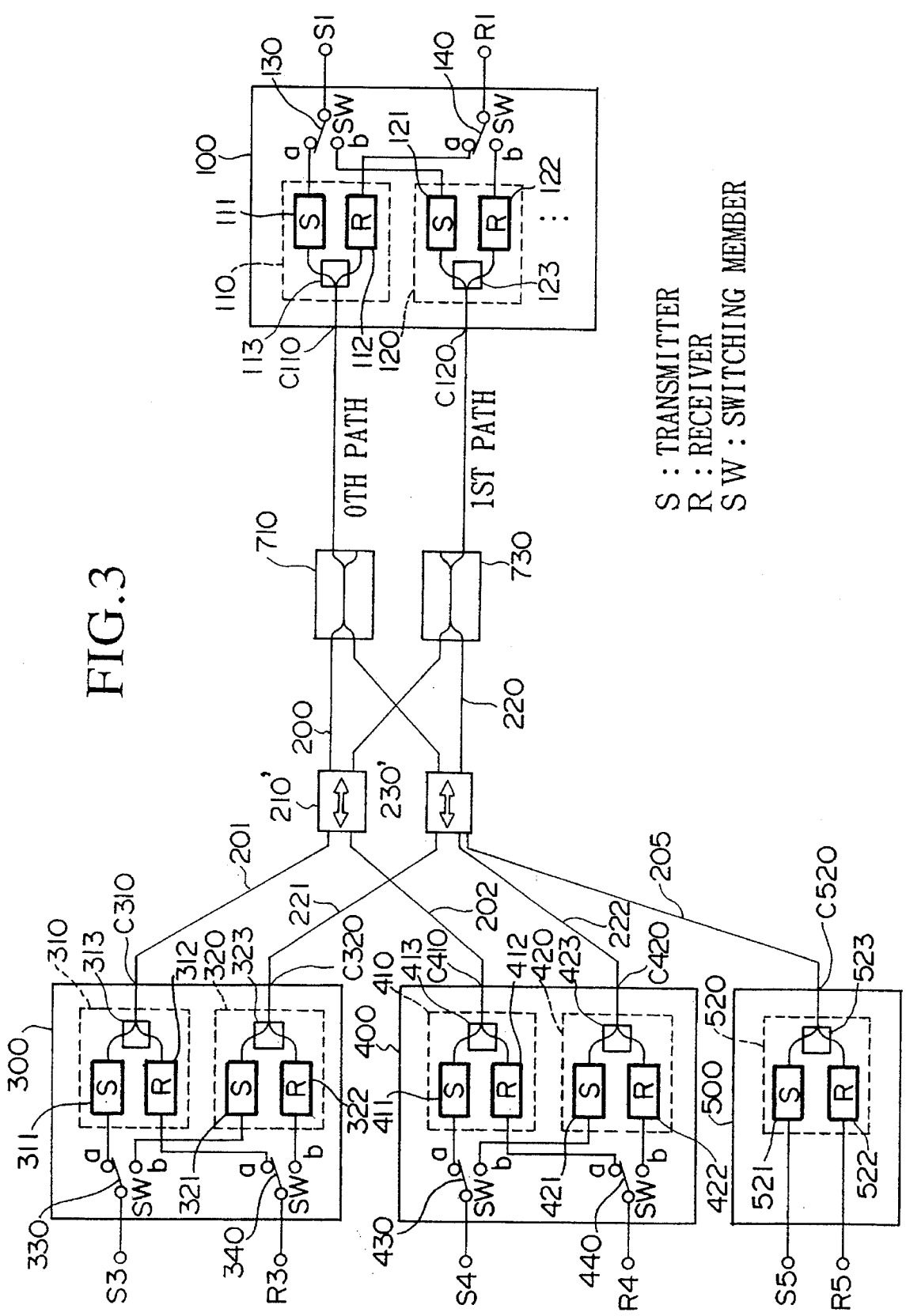
FIG. 3 is a block diagram of a third embodiment of point-to-multipoint optical transmission system.

A third embodiment of the point-to-multipoint optical system offering multiplexed communication services is presented in FIG. 3. This embodiment also relates to a case of interactive multiplexed communication system having a central office and three subscribers. In FIG. 3, those parts which are common to the system shown in FIGS. 1 and 2 are given the same reference numerals.

The difference between the second and third embodiments is that the optical couplers 210, 230 and 720 have been replaced with 2×2 (2 input: 2 output) optical couplers 210' and 230' and with optical couplers 710, 730 to improve the reliability of connections among the optical couplers 210, 230 and 720.

In FIG. 3, the optical coupler 710 optically connects the transceiver 110 in the 0th path of the central office equipment 100 with the optical couplers 210', 230', and the optical coupler 730 optically connects the transceiver 120 in the 1st path of the central office equipment 100 with the optical couplers 210', 230'. By adopting such a network configuration, the entire network is completely provided with a duplication system. It should be noted in the first embodiment that complete duplication can be provided by replacing each of the 1×2 optical couplers 210*a*, 210*b*, 230*a* and 230*b* with a 2×2 optical coupler, and by providing four optical merger/splitter between the central office equipment 100 and the 2×2 optical couplers.

In this embodiment also, the switching procedures applied in the first embodiment to the failures at point P1, P2; P3, P4; and P5, P6 are applied simultaneously. The remaining parts of the network is the same as that in the first and second embodiments, and their explanation will be omitted.

According to this embodiment, as in the first and second embodiments, the probability of generating momentary interruptions can be lowered, and high quality and reliable communication services can be provided. Furthermore, the optical path system as a whole need not be switched over from one system to another, therefore, the network configuration of this embodiment also enables to provide high quality and reliable communication services even to a subscriber who does not have a redundancy system, so long as his local system is free of problems.

Fourth Embodiment

Figure 4:
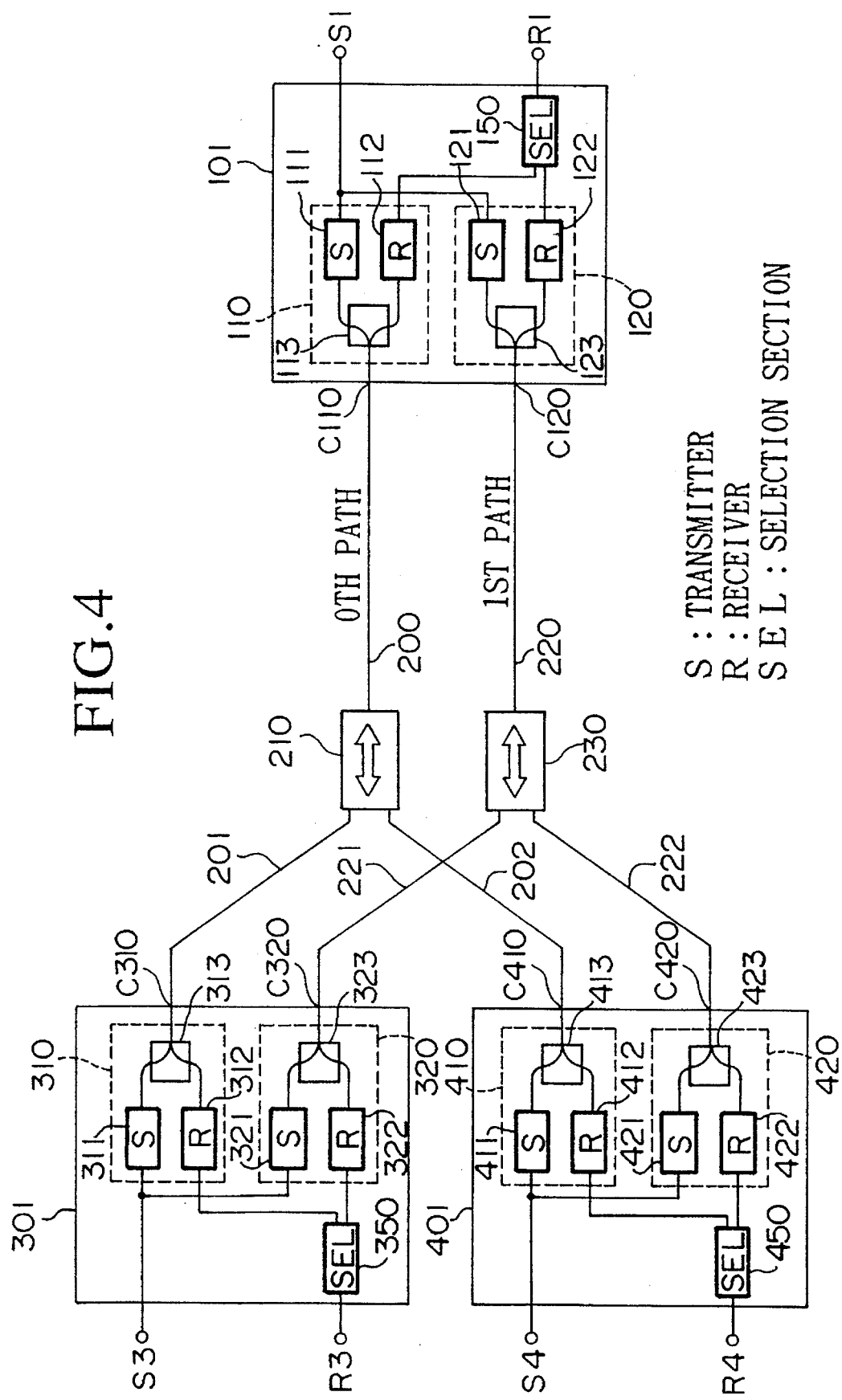
FIG. 4 is a block diagram of a fourth embodiment of point-to-multipoint optical transmission system.

A fourth embodiment of the point-to-multipoint optical system offering multiplexed communication services is presented in FIG. 4. For simplicity, the communication network of the fourth embodiment relates to a case of multiplexed communication system in which a central office and two subscribers are involved. In FIG. 4, those parts which are common to those shown in FIG. 24 are given the same reference numerals, and their explanations are omitted.

In FIG. 4, the central office equipment 101 comprises two systems of transceivers 110, 120 which perform communications between itself and the corresponding subscriber's equipment 301, 401, and selection section 150 which selects transmission signals exchanged therebetween. The D-signals inputted from an input port S1 are supplied to transmitter 111 of the transceiver 110 and the transmitter 121 of the transceiver 120.

On the other hand, the subscriber's equipment 301 comprises two systems of transceivers 310, 320 for communicating with the central office equipment 101, and a selection section 350 which selects transmission signals exchanged therebetween. The output signals inputted into the input port S3 are supplied to transmitter 311 of the transceiver 310 and to the transmitter 321 of the transceiver 320.

Similarly, the subscriber's equipment 401 comprises two systems of transceivers 410, 420 for communicating with the central office equipment 101, and a selection section 450 which selects transmission signals exchanged therebetween. The output signals inputted into the input port S4 are supplied to transmitter 411 of the transceiver 410 and to the transmitter 421 of the transceiver 420.

Each of the selection sections 150, 350, 450 selects one normal signal from the two input signals. This selection process is carried out by means of an error detection method such as CRC (cyclic redundancy check code) so that a signal without any error can be chosen. Further, when both signals contain errors, each of the selection sections 150, 350 and 450 selects one signal having the least frequency of generated errors. If there is no error in either signal, one is chosen randomly.

According to the network configuration shown in FIG. 4, two optical paths systems operate in parallel constantly. In more detail, one optical path comprises: transceiver 110 of the central office equipment 101; the corresponding transceiver 310 of the subscriber's equipment 301; the transceiver 410 of the subscriber's equipment 401; optical fibers 200, 201, 202; and optical coupler 210. The other optical path comprises: transceiver 120 of the central office equipment 101; the corresponding transceiver 320 of the subscriber's equipment 301; the transceiver 420 of the subscriber's equipment 401; optical fibers 220, 221 222; and optical coupler 230.

Next, the communication diagram in the above network will be explained with reference to FIG. 5. It is similar to the diagram shown in FIGS. 25 and 26, and utilizes interactive multiplexing and time division multiplexing for the subscriber signals.

As shown in FIG. 5, during the first half broadcasting period Ts of the total repetition period T, the D-signals D1, D2 are outputted in accordance with the following steps from the central office equipment 101, and are received by the subscriber's equipment 301, 401.

Step 1

Signals D1, D2 are inputted into the input port S1 of the central office equipment 101, and are supplied to each transceiver 110, 120.

Step 2

Signals D1, D2 are converted to optical signals in the transmitter 111 of the transceiver 110, and are outputted to optical fiber 200 from the I/O port C110 via the optical coupler 113.

Similarly, signals D1, D2 are converted to optical signals in the transmitter 121 of the transceiver 120, and are outputted from the I/O port C120 to optical fiber 220 via the optical coupler 123.

Step 3

Signals D1, D2 outputted from the I/O port C110 are divided in the optical coupler 210, and are supplied to the I/O port C310 of the subscriber's equipment 301, and to the I/O port C410 of the subscriber's equipment 401 via the respective optical fibers 201, 202. The transceiver 310 of the subscriber's equipment 301 divides the signals D1, D2 in the optical coupler 313, and converts the divided signals to electrical signals in the receiver 312, and signal D1 addressed to the subscriber's equipment 301 is discriminated, and is outputted to an input terminal of the selection section 350. Also, in the transceiver 410 of the subscriber's equipment 401, signals D1, D2 are branched by the optical coupler 413, converted into electrical signals in the receiver 412, and signal D2 addressed to itself is discriminated, and is outputted to one of the input terminal of the selection section 450.

Similarly, signals D1, D2 outputted from the I/O port C120 are divided in the optical coupler 230, are supplied to the respective output ports C320 and C420 of the subscriber's equipment 301, 401. The transceiver 320 of the subscriber's equipment 301 divides the signals D1, D2 in the optical coupler 323, and converts the divided signals to electrical signals in the receiver 322, and signal D1 addressed to the subscriber's equipment 301 is discriminated, and is outputted to the other input terminal of the selection section 350. Also, in the transceiver 420 of the subscriber's equipment 401, signals D1, D2 are branched by the optical coupler 423, converted into electrical signals in the receiver 422, and signal D2 addressed to itself is discriminated, and is outputted to the other input terminal of the selection section 450.

Step 4

In the subscriber's equipment 301, the selection section 350 selects one signal of higher quality from the two signals D1 supplied to its two terminals, and outputs the selected signal through the output port R3.

Similarly, in the subscriber's equipment 401, the selection section 450 selects one signal of higher quality from the two signals D2 supplied to its two terminals, and outputs the selected signal through the output port R4.

Next, during the latter half signal receiving period $T_R$ of the signal sending/receiving repetition period T, a U-signal U1 from the subscriber's equipment 301, and a U-signal U2 from the subscriber's equipment 401 are forwarded to the central office equipment 101 in the following sequence.

Step 5

Signal U1 is inputted into the input port S3 of the subscriber's equipment 301, and is supplied to each of the transceivers 310, 320.

Similarly, signal U2 is inputted into the input port S4 of the subscriber's equipment 401, and is supplied to each of the transceivers 410, 420.

Step 6

In the transceiver 310, signal U1 is converted into optical signal in the transmitter 311, and is outputted from the I/O port C310 to optical fiber 201 via the optical coupler 313. In the transceiver 320, signal U1 is converted into optical signal in the transmitter 321, and is outputted from the I/O port C320 to optical fiber 221 via the optical coupler 323.

Similarly, in the transceiver 410, signal U2 is converted into optical signal in the transmitter 411, and is outputted from the I/O port C410 to optical fiber 202 via the optical coupler 413. In the transceiver 420, signal U2 is converted into optical signal in the transmitter 421, and is outputted from the I/O port C420 to optical fiber 222 via the optical coupler 423.

In this case, to prevent the signals U1 and U2 from superimpose upon each other in the optical fibers 200, 220, they are outputted at predetermined time positions, i.e., time division multiplexed.

Step 7

Signals U1, U2 outputted from I/O ports C310, C410 are coupled in the optical coupler 210, and are supplied to the I/O port C110 of the central office equipment 101 via optical fiber 200. Signals received in the receiver 110 of the central office equipment 101 are divided in the optical coupler 113, photo-electric converted in the receiver 112, and is inputted into one of the terminals of the selection section 150.

Similarly, signals U1, U2 outputted from I/O ports C320, C420 are coupled in the optical coupler 230, and are supplied to the I/O port C120 of the central office equipment 101 via optical fiber 220. Signals received in the receiver 120 of the central office equipment 101 are divided in the optical coupler 123, photo-electric converted in the receiver 122, and is inputted into the other terminal of the selection section 150.

Step 8

In the subscriber's equipment 101, the selection section 150 selects one signal of higher quality from the two signals U1, U2 supplied to its two terminals, and outputs the selected signal through the output port R1.

The above eight steps are repeated for each signal sending/receiving repetition period T.

For simplicity, such components as synchronizing frame for synchronizing signal sending/receiving, control channels for transmission timing assignment and switching operations in the subscriber's equipment and propagation delay time in the optical fibers are omitted from FIG. 5.

According to the fourth embodiment, two communication systems simultaneously operate in parallel between the equipment 101 on the one hand and equipment 301, 401 on the other. In the central office equipment 101, the selection section 150 selects one U-signal of higher quality from the two signals outputted from the subscriber's equipment 301 or 401. In the subscriber's equipment 301 or 401, the selection section 350 or 450 selects one D-signal from the two D-signals supplied by the equipment 101.

Therefore, in the conventional network in which the operational system is switched totally from a defective system to a sound system, it requires that every one of the components in the switched system be normal. In contrast in this embodiment, normal communication can be carried out if one of the systems is operating normally. Therefore, the network configuration of this embodiment represents a significant improvement in reliability of service. Additionally, in this embodiment, switching devices and their associated control devices are not necessary.

Fifth Embodiment

Figure 6:
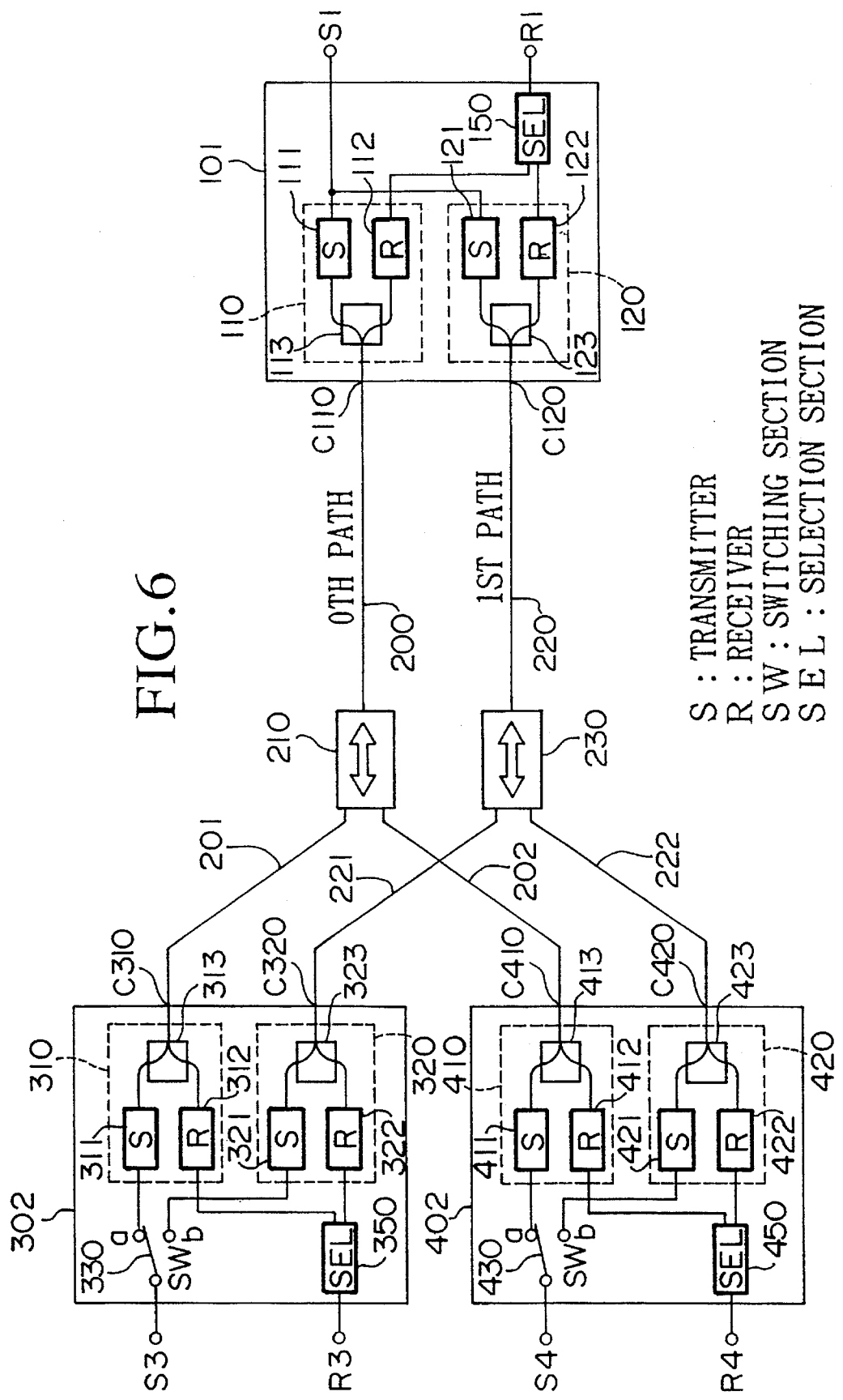
FIG. 6 is a block diagram to explain the construction of the point-to-multipoint optical transmission system of the fifth embodiment.

A fifth embodiment of the point-to-multipoint communication system is presented in FIG. 6. For simplicity, the communication network of the fifth embodiment relates to a case of multiplexed communication system in which a central office and two subscribers are involved. In FIG. 6, those parts which are common to those shown in FIGS. 1 and 4 are given the same reference numerals, and their explanations are omitted.

In FIG. 6, the central office equipment 101 comprises transceivers 110, 120 which perform broadcast communications between itself and the corresponding subscriber's equipment 301, 401, and selection section 150 which selects one transmission signals exchanged therebetween, On the other hand, the subscriber's equipment 302 comprises two systems of transceivers 310, 320 for communicating with the central office equipment 101, and a switching section 330 which selects the transceiver to be supplied with signals inputted into the input port S3, and a selection section 350 which selects one signal received in the transceivers 310, 320. Similarly, the subscriber's equipment 402 comprises two systems of transceivers 410, 420 for communicating with the central office equipment 101, and a switching section 430 which selects the transceiver to be supplied with signals inputted into the input port S4, and a selection section 450 which selects one signal from the signals received in the transceivers 410, 420.

The transceiver 110 of the equipment 101 is connected to the transceivers 310, 410 of the subscriber's equipment 302, 402, respectively, via optical fibers 200, 201, 202 and optical coupler 210. On the other hand, the transceiver 120 of the equipment 101 is connected to the transceivers 320, 420 of the subscriber's equipment 302, 402, respectively, via optical fibers 220, 221, 222 and optical coupler 230.

The details of the construction of the components will be explained with reference to FIGS. 7 to 11.

Figure 7:
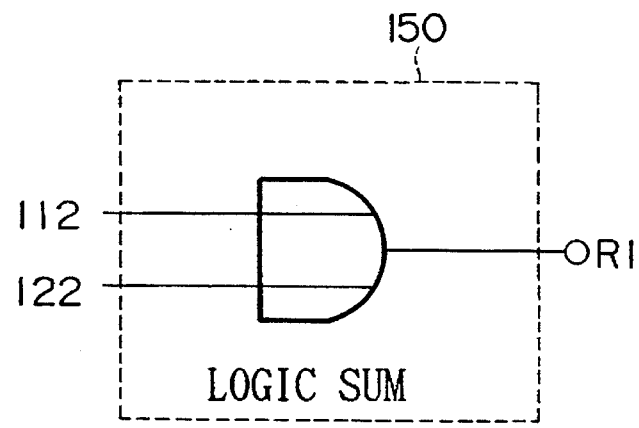
FIG. 7 is an illustration showing the construction of the selection section 150.

FIG. 7 explains the construction of the selection section 150, which receives output signals from the receiver 112 of the transceiver 110 of the equipment 101, and from the receiver 122 of the transceiver 120, and outputs the logic sum value to the output port R1. Only one of the pairs of transceivers 310, 320 and 410, 420 provided respectively on the equipment 302, 402 performs signal transmission role.

Figure 8:
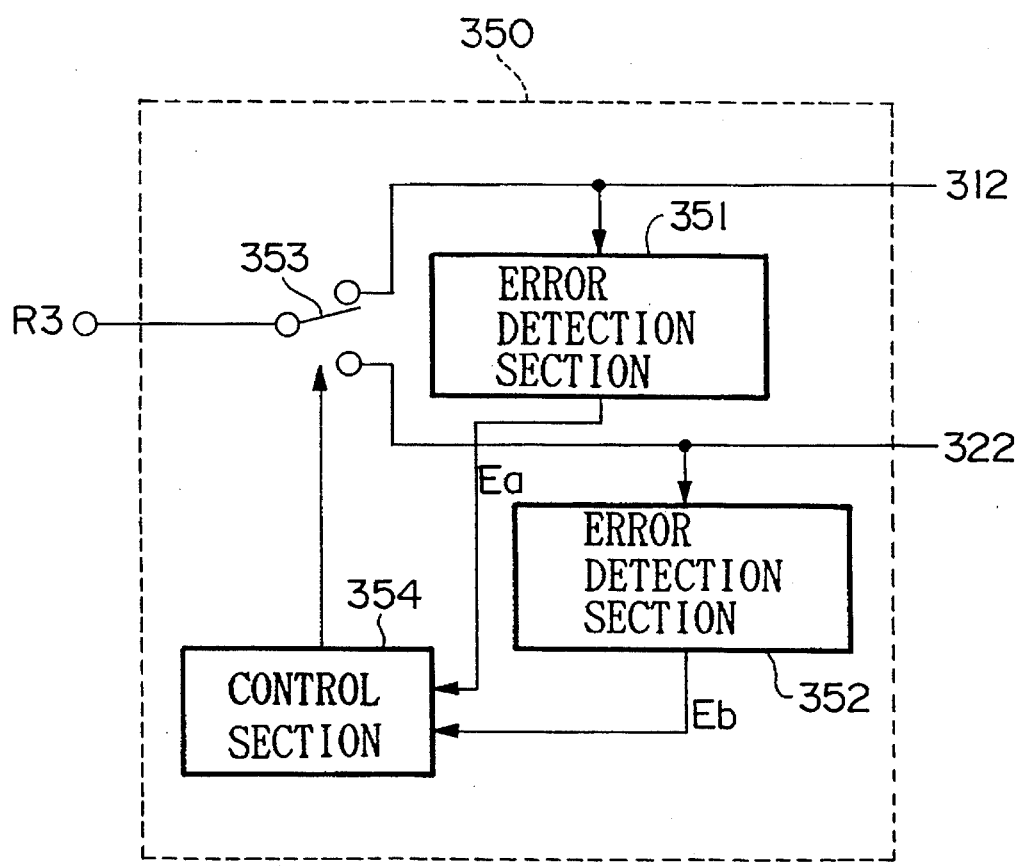
FIG. 8 is a schematic block diagram showing the construction of the selection section 350.

Therefore, the U1, U2 signals transmitted from the subscriber's equipment 302, 402 to the central office equipment 101 are inputted into only one of the input terminals of the selection section 150, thus obtaining a logic sum of the two signals and outputting the result. This network configuration thus achieves a simple selector function without switching the input signal for every transmission, FIG. 8 is a schematic block diagram of the selection section 350. The output signal from the receivers 312, 322 are inputted through the switching member 353 to the error detection sections 351, 352. The error detection sections 351, 352 examine the inputted signal for the presence of signal errors, and the detected error signals Ea, Eb are outputted to the control section 354. Error detection methods such as CRC discussed in fourth embodiment may be used.

The control section 354 control the operation of the switching member 353 on the basis of the information generated by error signals represented by Ea, Eb in this case. An example of switching action will be explained below. First, based on the error signals Ea, Eb, the control section 354 commands that the switching member 353 select one signal for which errors were not detected. If both signals contained error, the switching member 353 selects one signal which contain the least number of errors. If both signals are error-free, then the switching member selects one signal randomly.

In general, the receivers 312, 322 in the subscriber's equipment 302 are often provided with error detection capability. In such a case, the receivers 312, 322 may input error signals directly to the control section 354, and there would be no need for providing error signal detection sections 351, 352 in the selection section 350. The other selection section 450 has the same construction as that of the selection section 350, and the explanation will be omitted.

Figure 9:
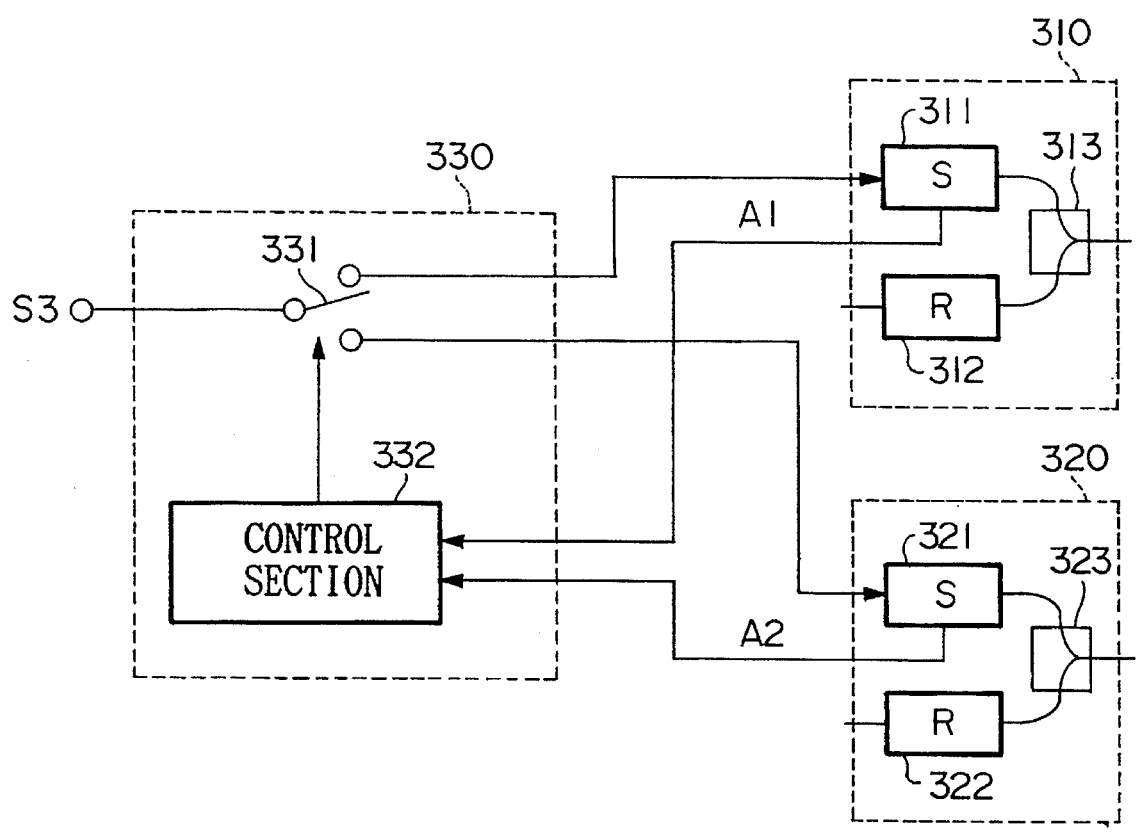
FIG. 9 is a schematic block diagram showing the construction of the switching section 330.

FIG. 9 is a schematic block diagram of the switching section 330. The switching section 330 comprises a switching member 331 and a control section 332. The control section 332 receives malfunction signals A1, A2 outputted from the transmitters 311, 321. When the control section 332 receives a malfunction signal from one of the transmitters, directs the switching member 331 so that input signal is forwarded to the remaining normally functioning switching member. Malfunction signals can be obtained, for example, from laser diode monitoring light from the electro-optical converter section in the transmitter.

More specifically, a laser diode for converting electrical signals to optical signals and inputting the light signals into optical fibers, and a monitor photo-diode for converting the light signals into corresponding electrical signals are constructed as a unit member. This construction permits malfunctioning in the by comparing the output electrical signals of the photo-diode with the electrical signals inputted in the transceivers. The construction and operation of the other switching section 430 are the same as those for the switching section 330, and their explanation will be omitted.

Figure 10:
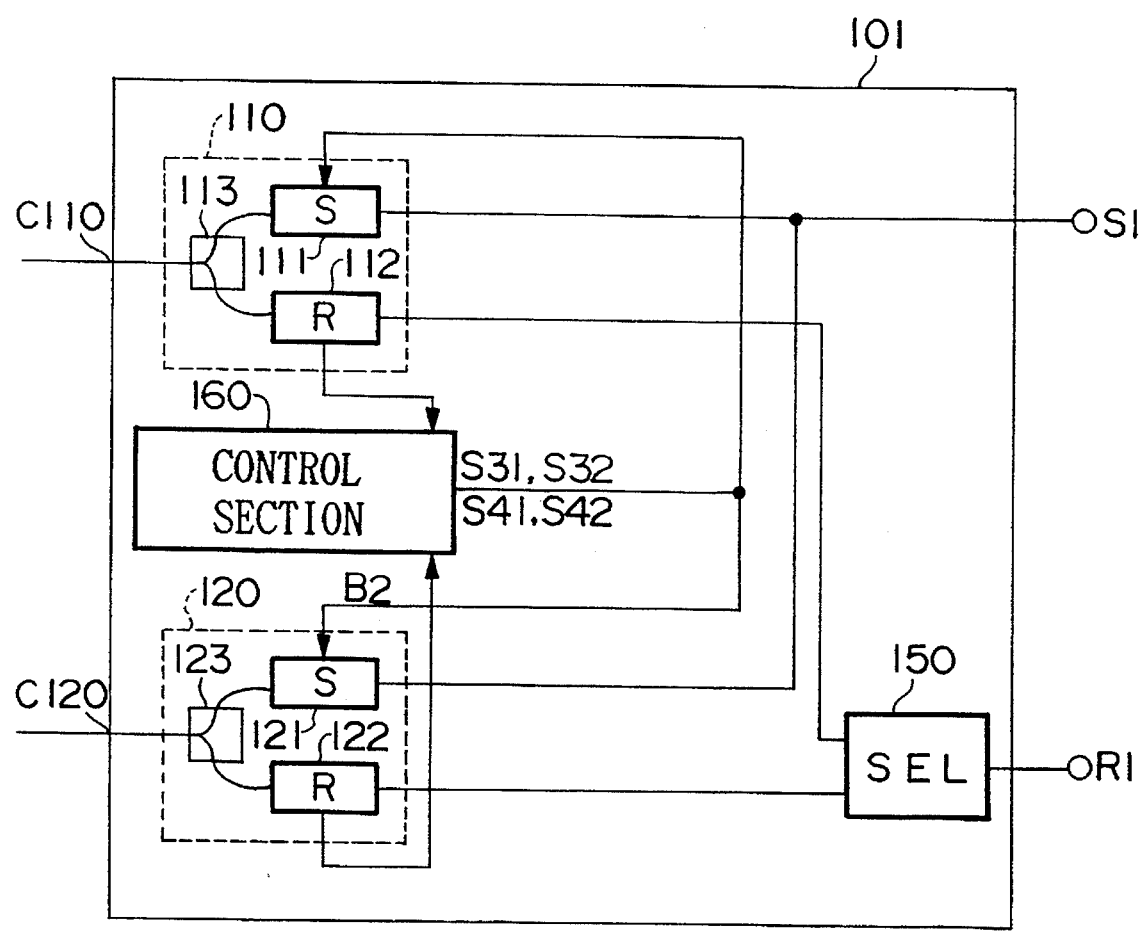
FIG. 10 is a block diagram of the central office equipment 101.
Figure 11:
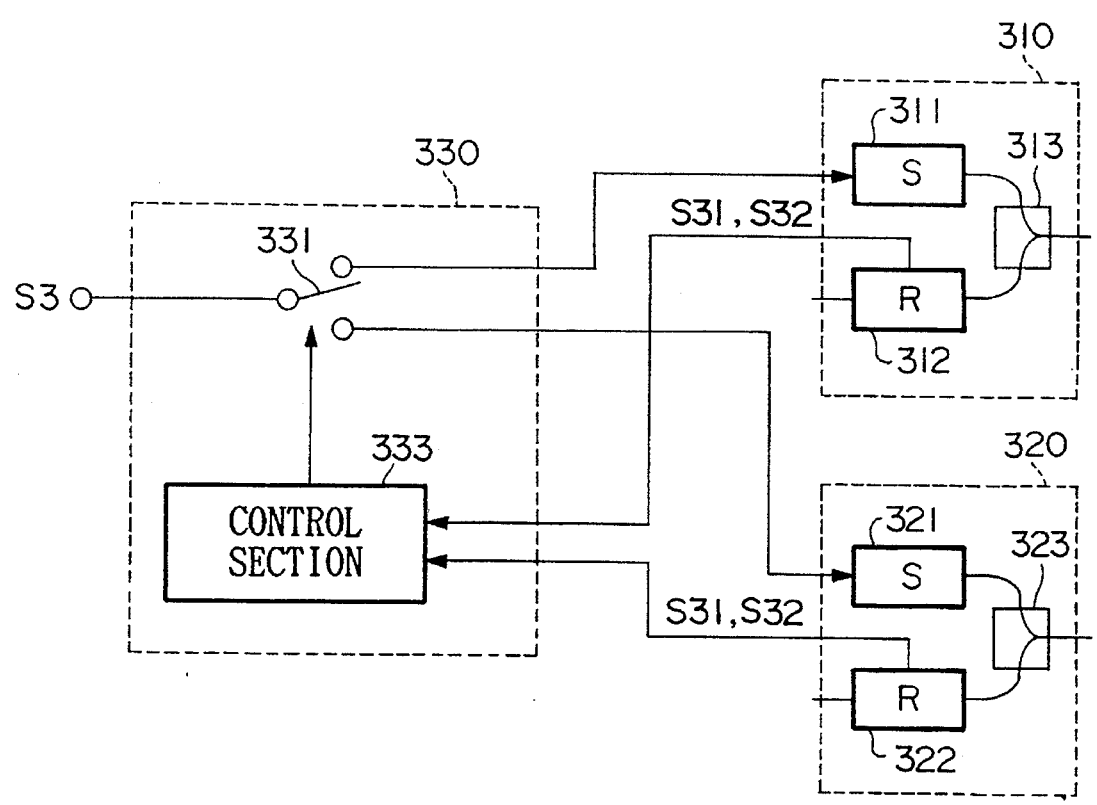
FIG. 11 is a schematic block diagram showing the construction of the switching section 330.

FIG. 10 is a schematic block diagram of the central office equipment 101. The control section 160 of the equipment 101 receives signals from the receivers 112, 122 of the transceivers 110, 120, and monitors time division multiplexed signals transmitted to each subscriber's equipment in a plurality of subscriber's equipment. Specific monitoring action of the control section 160 will be explained below. For example, let us assume in the network shown in FIG. 6 that the transmitters 311, 411 are operating in the two subscriber's equipment 302, 402. It is further assumed that a problem develops somewhere in one signal path including transmitter 311, optical coupler 313, optical fiber 201 or 200, optical coupler 210 (all associated with equipment 302), optical coupler 113 or receiver 112 (all associated with central office equipment 101). Then, the output signal from the receiver 112 indicates that the signal from the equipment 302 has been "cut off" or "many error signals". The control section 160 shown in FIG. 10 detecting that the receiver 112 is experiencing signal "cut off" or "many errors", issues a switching signal S31 to the transmitters 111, 112 of the transceivers 110, 120. Accordingly, the transmitters 111 and 121 incorporate the switching signal S31 by multiplexing it in the D-signals.

Similarly, if a problem develops in any of transmitter 321, optical coupler 323, optical fiber 221 or 220, optical coupler 230 (all associated with equipment 302), optical coupler 123, or receiver 122 (all associated with central office equipment 101), the output signal from the receiver 122 indicates that the signal from the equipment 302 is either "cut off" or "many error signals", then the control section 160 issues a switching signal S32 by multiplexing it in the D-signals via the transmitters 111, 121 of the transceivers 110, 120.

The operation of the switching section 330 (shown in FIG. 9) in the case described above will be explained with reference to FIG. 11. The control section 330 includes both network configurations shown in FIGS. 9 and 11. The control section 333 of the switching section 330 receives switching signals S31, S32 outputted from the receivers 312, 322. Upon receiving the switching signal S31, the control section 333 switches the switching member 331 via the transmitter 321. Upon receiving the switching signal S32, the control section 333 switches the switching member 331 via the transmitter 311.

When the malfunction signal from subscriber's equipment 402 indicates "cut off" or "many error signals", similar switching operations are performed in accordance with the switching signals S41, S42 which correspond to the switching signals S31, S32.

The communication diagram in the network of the configuration presented above will be explained below with reference to FIG. 12. As in FIG. 5, it is an example of using time division multiplexing in the interactive subscriber system. The steps 1 to 4 during the first half period Ts of the repetition period T are the same as those in FIG. 5, and their explanation will be omitted. The only difference between the steps in the fourth and fifth embodiments is that the subscriber's equipment 302, 402 replace the subscriber's equipment 301, 401.

In this embodiment, the U-signals, U1, U2 respectively from the equipment 302, 402 during the latter half receiving period $T_R$ of the repetition period T are handled as explained below.

First, the signal U1 to be transmitted is inputted into the input port S3 of the equipment 302 (refer to FIG. 6) and is inputted into one of the transceivers 310 or 320 via the switching section 330. In FIG. 6, the switching section 330 is on the "a" side, and the signal U1 is supplied to the transceiver 310. In the transceiver 310, the signal U1 is converted to optical signal, and is outputted from the I/O port C310 to the optical fiber 201 via optical coupler 313.

In the meantime, the signal U2 to be transmitted is inputted into the input port S4 of the equipment 402 (refer to FIG. 6) and is inputted into one of the transceivers 410 or 420 via the switching section 430. In FIG. 6, the switching section 430 is on the "a" side, and the signal U2 is supplied to the transceiver 410. In the transceiver 410, the signal U2 is converted to light signal, and is outputted from the I/O port C410 to the optical fiber 202 via optical coupler 413.

The signals U1, U2 outputted respectively from the I/O port C310, C410 are merged in the optical coupler 210, and the merged signal is inputted into the I/O port C110 of the central office equipment 101. No signals are outputted from the I/O ports C320, C420 of the subscriber's equipment 302, 402.

The signals U1, U2 inputted into the I/O port C110 of the equipment 101 are inputted into the receiver 112 of the equipment 110 via the optical coupler 113. The signals U1, U2 are converted into electrical signals in the receiver 112, and are inputted into the selection section 150. There are no input signals in the I/O port C120, and therefore there is no signal to be forwarded to the selection section 150 from the receiver 122. The selection section 150 takes a logic sum of signals U1, U2, and outputs the logic sum signal to the output port R1. The signals U1, U2 are outputted from the receiver 112 only, because the receiver 122 has no output signal, the signals from the receiver 112 are outputted to the output port R1.

Figure 13:
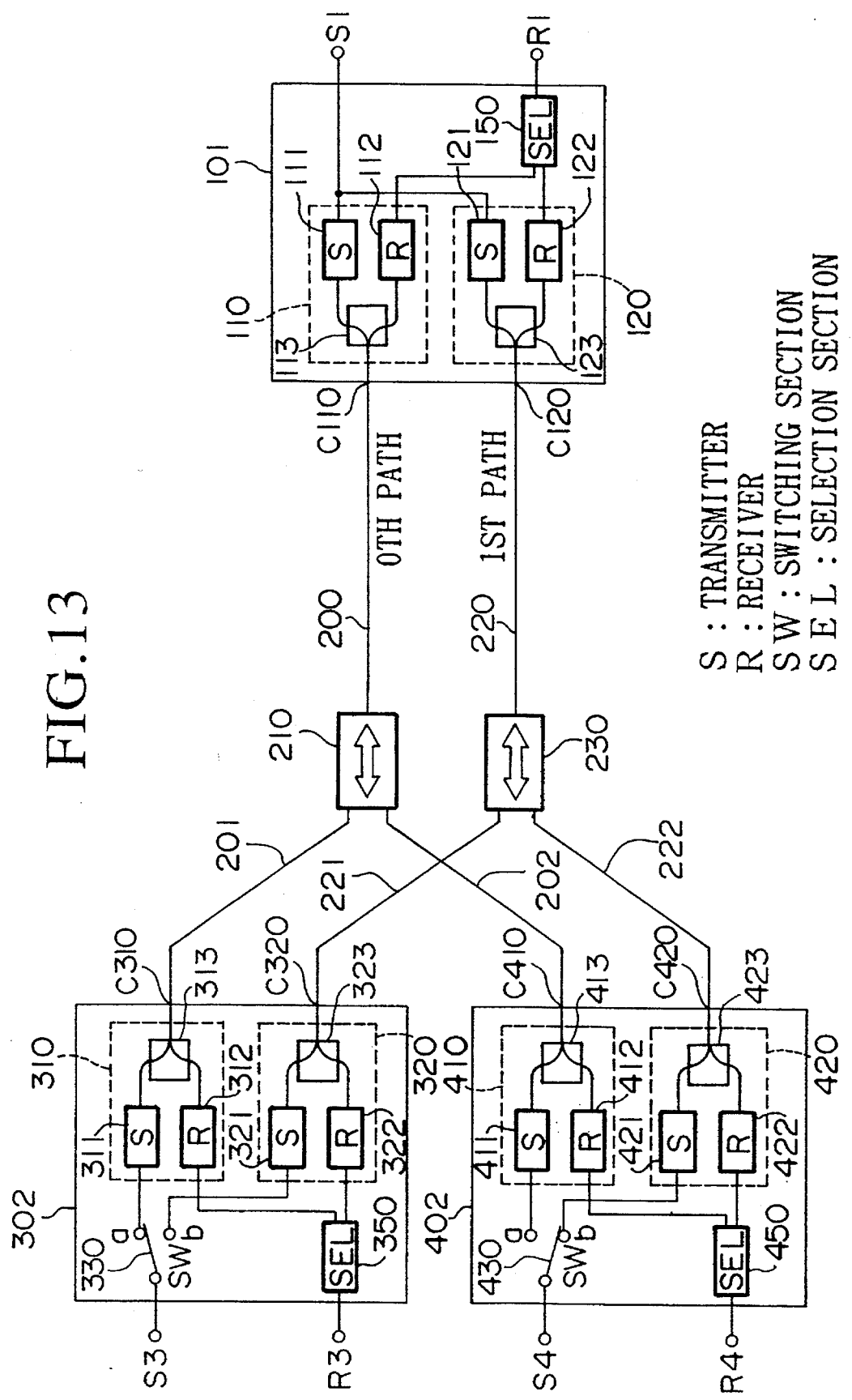
FIG. 13 is an illustration of the point-to-multipoint optical transmission system of the fifth embodiment.

Next, the operation of the system when the switching section 330 of the subscriber's equipment 302 is switched over to the "a" side, and the switching section 430 of the equipment 402 is switched over to the "b" side, as shown in FIG. 13, will be explained with reference FIGS. 13 and 14. FIG. 14 is a communication diagram for the network configuration shown in FIG. 13, and is an example of time division multiplexing in the interactive subscriber system, similar to that shown in FIG. 12.

As shown clearly in FIG. 14, the operating steps during the broadcasting period $T_S$ are the same as those in FIG. 12, their explanations will be omitted. During the period $T_R$, the signals U1, U2 from the subscriber's equipment 302, 402 are forwarded to the central office equipment 101 as described below.

First, the signal U1 from the equipment 302 inputted into the input port S3 of the equipment 302 and is inputted into the transceiver 310 on the "a" side via the switching section 330. In the transceiver 310, the signal U1 is converted to light signal., and is outputted from the I/O port C310 via the optical coupler 313. The signal U1 is inputted into the I/O port C110 of the equipment 101 via the optical fiber 201, optical coupler 210 and optical fiber 200. The signal inputted into the I/O port C110 is converted into electrical signal in the transceiver 110, and is outputted to the selection section 150.

In the meantime, the signal U2 inputted into the input port S4 of the equipment 402 (refer to FIG. 12) and is inputted into the transceiver 420 on the "b" side. In the transceiver 420, the signal U2 is converted to light signal by the transmitter 421, and is outputted from the I/O port C420 via optical coupler 423. The outputted signal U2 is inputted into the I/O port C120 of the equipment 101 via optical fibers 222, optical coupler 230 and optical fiber 220. The signal U2 inputted into the I/O port C120 is converted into electrical signal in the transceiver 120, and is outputted to the selection section 150.

Here, no signals are outputted from the I/O port C320, C410 of the subscriber's equipment 302, 402, therefore, there will be no signal U2 outputted from the transceiver 110 to the selection section 150. Similarly, there will be no signal U1 outputted from the transceiver 120 to the selection section 150.

In the selection section 150, a logical sum of the signals from the two input terminals is obtained, and is outputted to the output port R1. In other word, signal U1 is selected from the transceiver 110, and signal U2 is selected from the transceiver 120, and both signals are outputted to the output port R1.

For simplicity, such components as synchronizing frame for synchronizing signal sending/receiving, control channels for transmission timing assignment and switching operations in the subscriber's equipment and propagation delay time in the optical fibers are omitted from FIG. 25.

According to the fifth embodiment, two communication paths simultaneously operate in parallel between the equipment 101 on the one hand and equipment 302, 402 on the other. In the central office equipment 101, the selection section 150 produces a logic sum of the U-signals inputted into its two input terminals for every U-signal transmission from each of the equipment 302, 402. In the subscriber's equipment 302 or 402, the selection section 350 or 450 selects one D-signal having higher quality signal from the two D-signals supplied by the equipment 101. Further, switching operations are performed on the signals, U1, U2 in the switching section 330, 430 of the equipment 302, 402, and the non-operating paths in the subscriber's equipment are shut down.

As described above, in the fifth embodiment as in the fourth embodiment, if at least one of the two parallel operating paths is functioning normally, it is possible to carry out normal communication operation. The reliability of the system is thus improved.

Further, signals U1, U2 are inputted into only one terminal in the selection section 150 which produces a logic sum of the two signals, and outputs the sum signal. Therefore, there is no need to switch for every U signal being transmitted, and the overall selector construction become simple.

If one of the transmitters in the subscriber's equipment 302, 402 malfunctions, the switching section 330, 340 operate so as to transmit U-signals to one of the functioning transmitters, thereby preventing wasteful outputting of "cut off" or "many errors" signals.

Sixth Embodiment

Figure 15:
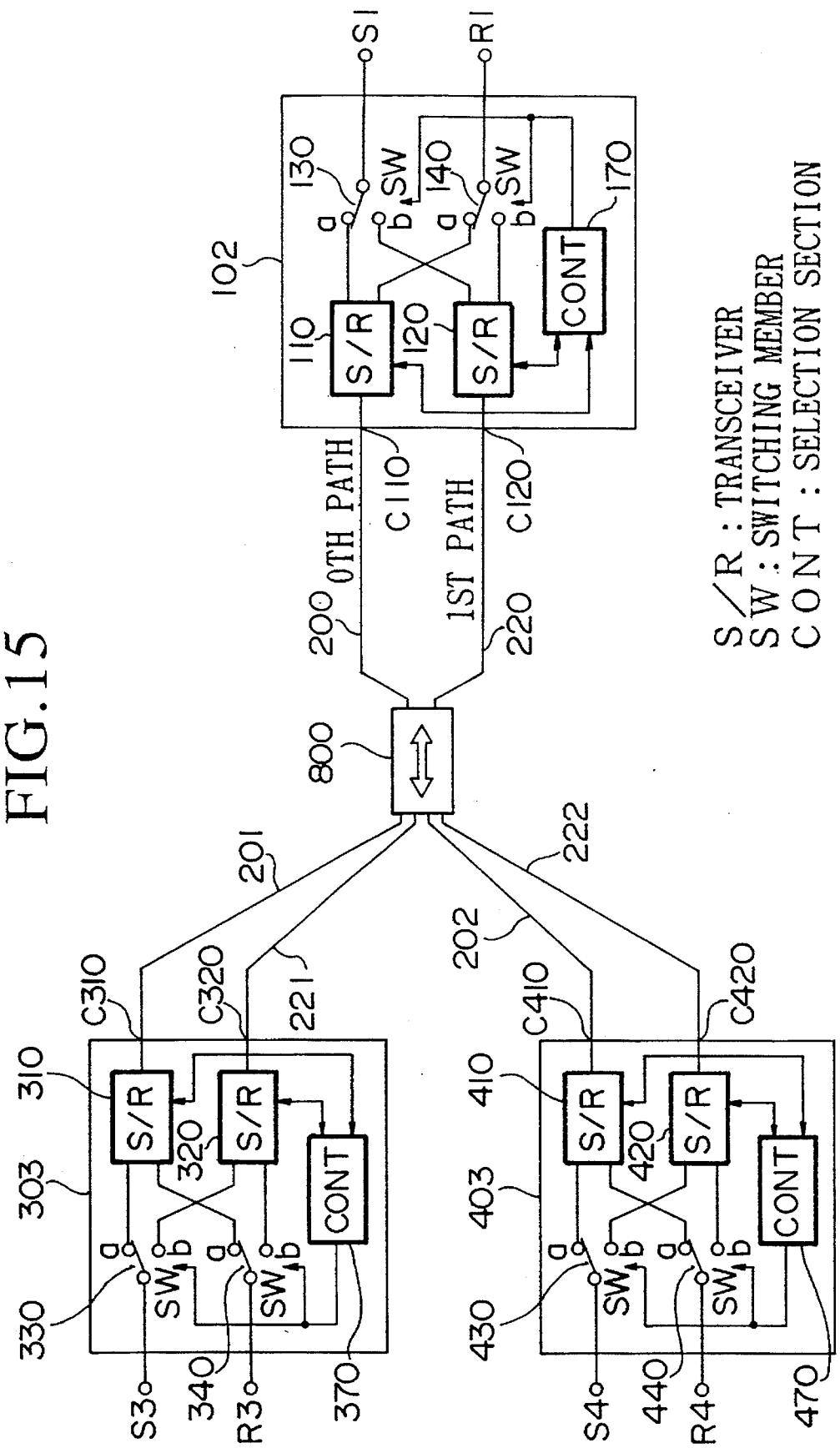
FIG. 15 is a block diagram of the point-to-multipoint optical transmission system of a sixth embodiment.

A sixth embodiment of the point-to-multipoint optical system offering multiplexed communication services is presented in FIG. 15. For simplicity, the communication network of the sixth embodiment relates to a case of multiplexed communication system in which a central office and two subscribers are involved. In FIG. 15, those parts which are common to those shown in FIGS. 1 and 6 are given the same reference numerals, and their explanations are omitted.

In FIG. 15, the reference numeral 800 designates an optical coupler connected to optical fibers 200, 201, 202, 220, 221 and 222. The optical coupler 800 merges the U-signals received from the transceivers 310, 320 of the subscriber's equipment 303 via optical fibers 201, 221 with the U-signals received from the transceivers 410, 420 of the subscriber's equipment 403 via optical fibers 202, 222, and divides the merged signals and outputs the divided signals to the optical fibers 200, 220. The optical coupler 800 also merges the D-signals transmitted via optical fibers 200, 220 from the central office equipment 102, and divides the merged signals and forwards the divided signals into optical fibers 201, 221, 202 and 222.

The control sections are designated by 170, 370 and 470, and all perform similar functions, and explanation is given only for one control section 170. The control section 170 is connected to each of the transceivers 110, 120, and examines the quality of the received signals, and switches the switching members 130, 140 when such an operation is deemed necessary. The construction of this control section 170 is based on the same principle as that for the control section 350 shown in FIG. 8. The description given above for the control section 170 applies also to the control sections 370, 470.

When the communication network shown in FIG. 15 is operating normally, i.e., no malfunctioning is occurring, the switching members 130, 140 of the central office equipment 102, the switching members 330, 340 of the subscriber's equipment 303, and the switching members 430, 440 of the subscriber's equipment 403 are all set to the "a" side of the system. Communication is carried out in the system comprising the transceiver 110 of the central office equipment 102, transceiver 310 of the subscriber's equipment 303 and transceiver 410 of the subscriber's equipment 403 through the optical fibers 200, 201, 202 and optical coupler 800.

When a problem develops in the transceiver 110 or optical fiber 200, the control section 170 switches the switching members 130, 140 over to the "b" side. By so doing, the communication is carried out among the transceiver 120, 310 and 410 through the optical fibers 220, 201, 202 and the optical coupler 800.

When a problem develops in the transceiver 310 or in the optical fiber 201, the control section 370 switches the switching members 330, 340 over to the "b" side. By so doing, optical communication between the subscriber's equipment 303 and the central office equipment 102 is carried out through the transceiver 320 and the optical fibers 221. On the other hand, when a problem develops in the transceiver 410 or in the optical fiber 202, the control section 470 switches the switching members 430, 440 over to the "b" side. Optical communication between the subscriber's equipment 403 and the central office equipment 102 is carried out through the transceiver 420 and the optical fibers 222.

According to this embodiment, when a problem develops in a transceiver or in an optical fiber connected thereto, switching is performed within the local path of the problem by switching to another independent optical path.

The control action for the switching operation will be described. First, the switching steps will be explained when a problem develops in either the transceiver 310 of the equipment 303 or in the optical fiber 201. In such a case, of the various time division multiplexed U-signals from the subscriber's equipment 303, 403, the U-signal from the subscriber's equipment 303 will indicate "cut off" or "many errors" at the transceiver 110 of the central office equipment 102. In contrast, the U-signal from the subscriber's equipment 403 will continue to be transmitted normally.

The control section 170, detecting that the U-signal from the subscriber's equipment 403 is normal but the U-signal from the subscriber's equipment 303 indicates "cut off" or "many errors", the control section 170 issues a switching command by multiplexing the command signal with the D-signals to the subscriber's equipment 303. The switching members 130, 140 are not switched at this time.

In the subscriber's equipment 303, the D-signals received at the transceiver 310 will indicate "cut off" or "many errors", after which the switching command from the central office equipment 102 is received at the transceiver 320 of the subscriber's equipment 303. The command switching signal from the central office equipment 102 can be received by the transceiver 320 even when the transmission path is not active, because the transceiver is designed to be constantly operating.

Upon detecting that the D-signal from the central office equipment 102 received at the transceiver 310 indicates "cut off" or "many errors" and that the subsequent switching command from equipment 102 is received at the transceiver 320, the control section 370 switches the switching member 330, 340 over to the "b" side. The result is that the transceiver 320 of the equipment 303 is optically connected with the transceiver 110 in the central office equipment 102, and optical communication is carried out through the optical fiber 221, optical coupler 800 and optical fiber 200.

The switching operation described above applied equally to the switching operation when problems develop in the subscriber's equipment 403. When a problem develops in the transceiver 410 or in the optical fiber 202, the same procedure is carried out, and the transceiver 420 becomes optically connected to the transceiver 110 in the central office equipment 102 via the optical path including optical fiber 222 and optical coupler 800 and optical fiber 200. When a problem develops in the transceiver 110 or in the optical fiber 200, both U-signals from the subscriber's equipment 303, 403 become "cut off" or "many errors" at the transceiver 110 of the central office equipment 102. The control section 170, detecting that both multiplexed D-signals from the equipment 303, 403 are received at the transceiver 110 indicates "cut off" or "many errors", the control section 170 switches the switching member 130, 140 over to the "b" side. In this case, there will be no command signal issued to the subscriber's equipment 303, 403.

In the subscriber's equipment 303, the D-signal from the central office equipment 102 temporarily becomes "cut off" or "many errors". In this case, unless both transceivers 310, 320 receive "cut off" or "many errors", and also receive switching command signal from the central office equipment 102, the switching members 330, 340 are not switched over to the other side.

The result is that after the switching step is completed at the equipment 102, communication is carried out in the path including the transceiver 120, optical fiber 220, optical coupler 800, optical fiber 201 and transceiver 310. It is of course possible to apply the same operation as described above for the equipment 303 to the subscriber's equipment 403 in the path including transceiver 120, optical fiber 220, optical coupler 800, optical fiber 202 and transceiver 410.

The communication diagrams for the optical network presented above will be explained with reference to FIGS. 16 to 19. All the diagrams are based on interactive multiplexing for the broadcast signals, and time division multiplexing for the subscriber signals. FIG. 16 represents a case in which all the switching members 130, 140 of the central office equipment 102, the switching members 330, 340 of the subscriber's equipment 303 and the switching members 430, 440 of the subscriber's equipment 403 are set to the "a" side.

As shown clearly in FIG. 16, communication between the central office equipment 102 and the subscriber's equipment 303, 403 is repeated through the repetition period T, consisting of periods $T_S$ and $T_R$. During the broadcasting period $T_S$, D-signals D1, D2 from the central office equipment 102 are inputted into the input port S1 of the equipment 102. The signals D1, D2 are inputted into the transceiver 110 through the switching member 130.

In the transceiver 110, signal D1, D2 are converted to light signal, and are outputted from the I/O port C110 into the optical fiber 200. The signal D1, D2 are divided in the optical coupler 800, and are inputted into the I/O port C310, C320 of the equipment 303 and the I/O port C410, C420 of the equipment 403.

In the transceiver 310 of the equipment 303, the inputted D-signals are converted into electrical signals, and the signal D1 addressed to itself is discriminated by the respective equipment 303. The signal D1 discriminated is outputted to the I/O port R3 via the switching member 340. Similarly, in the transceiver 410 of the equipment 403, signal D2 is discriminated by the respective equipment 403, and this signal D2 is outputted to output port R4 via the switching member 440.

During the receiving period $T_R$ which follows the broadcasting period $T_S$, U-signals U1, U2 are outputted from the subscriber's equipment 303, 403 to the central office equipment 102. Specifically, signal U1 from the subscriber is inputted into the transceiver 310 via the input port S3 of the equipment 303 and the switching member 330.

In the transceiver 310, signal U1 is converted into light signal, and is outputted from the I/O port C310 to optical fiber 201. Similarly, light signal obtained by converting signal U2 inputted into transceiver 410, via input port S4, is outputted into optical fiber 202 via the I/O port C410. The signals U1, U2 are merged in the optical coupler 800.

The optical signal merged in the optical coupler 800 is inputted into the I/O ports C110, C120 of the central office equipment 102 via optical fibers 200, 220. The inputted optical signals U1, U2 are converted into electrical signals in the transceiver 110 of the equipment 102, and are outputted to output port R1 via the switching member 140. The converted signals are thus forwarded to the output port R1.

Next, the communication procedure when a problem is present in the transceiver 110 of the equipment 102 or in the optical fiber 200 will be explained with reference to FIG. 17. FIG. 17 is a communication diagram when the control section 170 switches the switching members 130, 140 in the central office equipment 102 to the "b" side. In other words, this diagram applies to a case in which the transceiver 120 of the equipment 102 communicates with the transceiver 310, 410 of the subscriber's equipment 303, 403 through the optical fiber 220.

The difference between the communication diagrams shown in FIGS. 16 and 17 is that, in the central office equipment 102, the I/O port C110 for handling signals in FIG. 16 has been replaced with the I/O port C120. When a problem develops in the transceiver 110 or in the optical fiber 200, the control section 170 in the equipment 102 switches the optical path comprised by the transceiver 110 and optical fiber 200 to the path comprised by the transceiver 120 and optical fiber 220 by means of the switching members 130, 140. By so doing, the signals are handled through the I/O port C120.

Next, the communication procedure when a problem is present in the transceiver 310 of the subscriber's equipment 303 or in the optical fiber 201 will be explained with reference to FIG. 18. FIG. 18 is a communication diagram when the control section 370 switches the switching members 330, 340 in the subscriber's equipment 303 to the "b" side. In other words, this diagram applies to a case in which the transceiver 320 of the subscriber's equipment 303 communicates with the transceiver 110 of the central office equipment 102 through the optical fiber 221.

The difference between the communication diagram shown in FIG. 16 and that in FIG. 18 is that the U-signal handling port during the receiving period $T_R$ (the period of U-signal transmission from equipment 303 to equipment 102) in FIG. 16 is C310 while in FIG. 18, it is I/O port C320. When a problem develops in the transceiver 310 or in the optical fiber 201, the control section 370 switches over the switching members 330, 340 comprised by transceiver 310 and optical fiber 201 to the other path comprised by transceiver 320 and optical fiber 221. By so doing, signal U1 is outputted through the I/O port C320.

Next, the communication procedure when a problem is present in the transceiver 410 of the subscriber's equipment 403 or in the optical fiber 202 will be explained with reference to FIG. 19. FIG. 19 is a communication diagram when the control section 470 switches the switching members 430, 440 in the subscriber's equipment 403 to the "b" side. In other words, this diagram applies to a case in which the transceiver 420 of the subscriber's equipment 403 communicates with the transceiver 110 of the central office equipment 102 through the optical fiber 222.

The difference between the communication diagram shown in FIG. 16 and that in FIG. 19 is that the U-signal handling port during the receiving period $T_R$ (the period of U2 signal transmission from equipment 403 to equipment 102) in FIG. 16 is C410 while in FIG. 19, it is I/O port C420. When a problem develops in the transceiver 410 or in the optical fiber 202, the control section 470 switches the switching members 430, 440 from the path comprised by transceiver 410 and optical fiber 202 to another path comprised by transceiver 420 and optical fiber 222. By so doing, signal U2 is outputted through the I/O port C420.

The detailed communication steps involved in the communication diagrams shown in FIGS. 17 to 19 are the same as those in FIG. 16, therefore, their explanations are omitted.

As described above, the control section 170 in the central office equipment 102, and the control sections 370, 470 in the subscriber's equipment 303, 403 operate as an independent control system to meet the problem generated within the local path.

As summarized above, in this embodiment, redundancy is provided for each communication path, comprised by transceivers and optical fibers connected thereto optically, within the network, comprised by the central office equipment 102, the subscriber's equipment 303, 403. Therefore, when a problem develops in either the transceiver or the optical fiber connected thereto, only the local path involved in the problem need to be switched over to the other normally operating path. The normal operation can thus be maintained if at least the remaining path is operating normally, and improving the reliability of the system.

Further, because the switching is performed within an independent local path, the failure is restricted to within one part of the network, and the switching operation affects only the local path, and there is no generation of momentary interruptions in the communication network linking other subscribers, thus maintaining high quality communications by preventing momentary interruptions.

Further, the system of this embodiment involves only one star coupler, the system construction is relatively simple. Further, because there is only one star coupler, the whole network failure occurs when the star coupler fails. However, optical couplers are in general passive devices, and their failure rate is quite low, and when discussing the probability of a network failure, optical couplers hardly present a realistic problem.

Further in this embodiment, since there is only one optical coupler, if any one of the transceivers 110, 120 in the central office equipment 102 operates, communication can be carried out using either the 0th or the 1st path within the network, and even those subscribers who have no redundancy path can continue to communicate within the operating path.

Further in this embodiment, each equipment was provided with a maximum of two transceivers from the viewpoint of system cost, reliability and ease in constructing switching arrangement so as to achieve a balanced operating system, however, it is permissible to provide for more than two redundancy paths.

It is also permissible to provide any number of transceivers in the central office equipment and subscriber's equipment so as to suit the reliability requirement in each case. Accordingly, when high reliability is needed, the number of transceivers should be increased, and when economy is important, the number of transceivers can be reduced. In view of the large effect that a failure in the central office equipment would generate, the number of transceivers should be higher than the corresponding number in the subscriber's equipment so as to lead to high reliability in the overall performance of the system.

Seventh Embodiment

The seventh embodiment of the point-to-multipoint communication system offering multiplexed communication services is based on the following concept.

As mentioned above, it is economically prohibitive to provide redundancy for those subscribers having no redundancy path by adding extra transceivers in the equipment. However, it is also true that unless some alternative is provided in the equipment which do not have a redundancy provision or in its associated optical fiber, it is not possible to include those subscribers in the 0th or in the 1st path in the network.

Therefore, it is desirable to have a system which allows inclusion of subscribers equipment in either the 0th or the 1st path in the network, without adding extra transceivers in the subscriber's equipment and without significantly altering the conventional system shown in FIG. 27, in other words, to achieve system modification simply and at low cost. The point-to-multipoint communication system presented in the seventh embodiment fulfills this need by providing an optical coupler which optically connects the transceiver in the subscriber's equipment with the 0th path as well as with the 1st paths.

Figure 20:
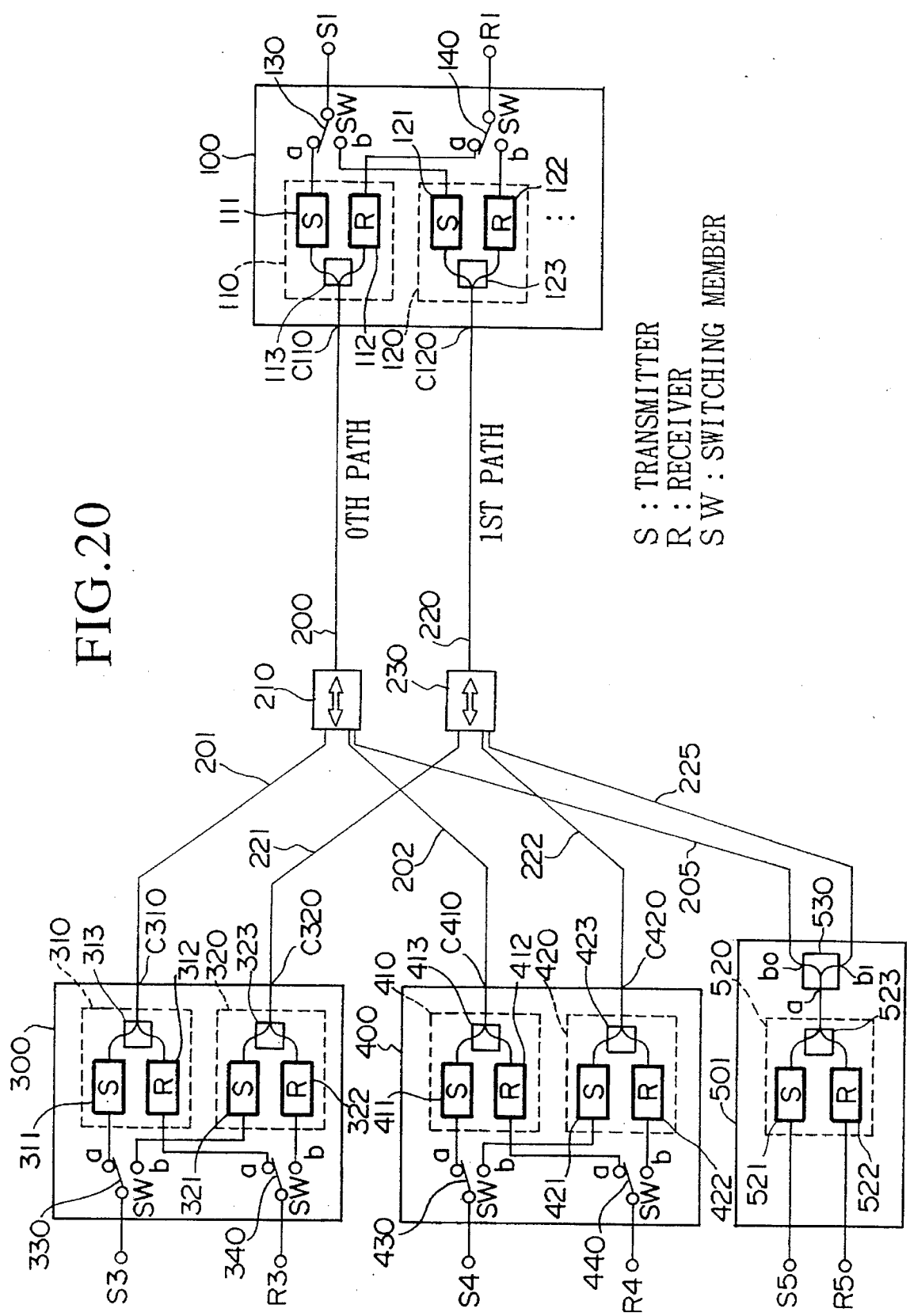
FIG. 20 is a block diagram of the point-to-multipoint optical transmission system of a seventh embodiment.
Figure 21:
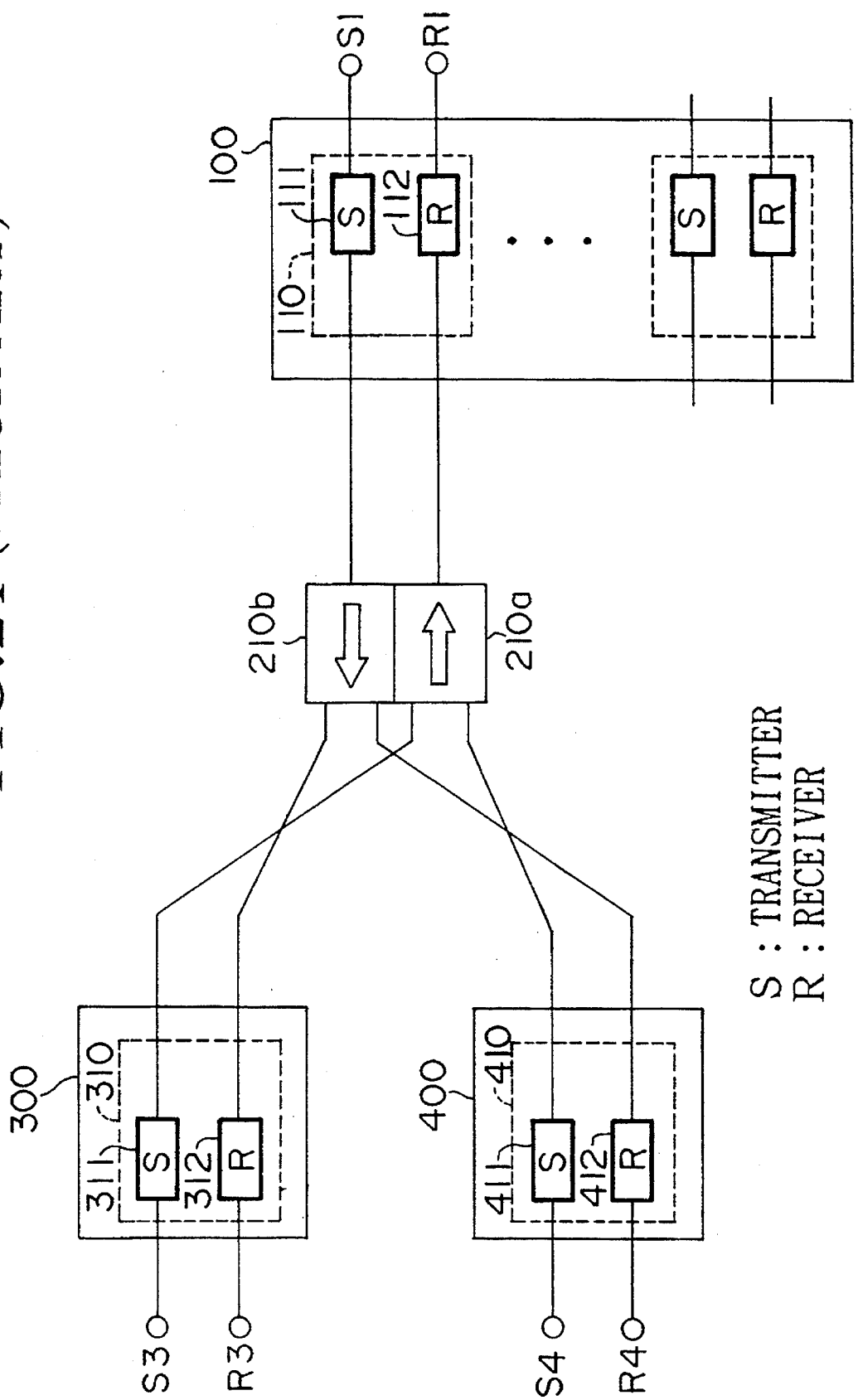
FIG. 21 is an illustration of the basic construction of the PDS system using an unidirectional star coupler.
Figure 22:
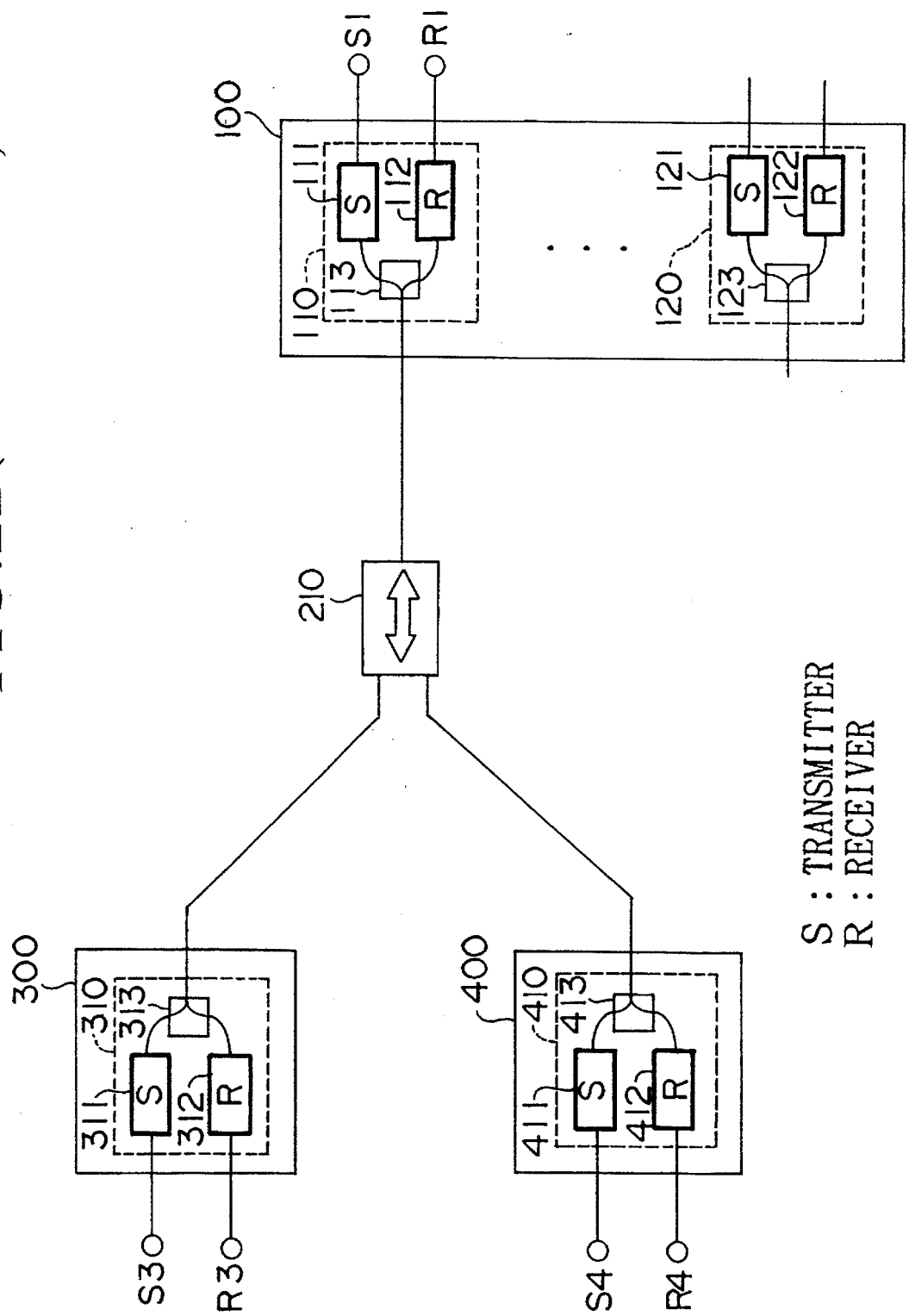
FIG. 22 is an illustration of the basic construction of the PDS system using a bidirectional star coupler.

FIG. 20 is a block diagram of the communication system of the seventh embodiment. For simplicity, the embodiment is illustrated in terms of a multiplexing system involving one central office equipment and three subscriber's equipment. In FIG. 20, those parts which are the same as in FIG. 27 are given the same reference numeral, and their explanations are omitted.

The difference between the systems shown in FIGS. 20 and 27 is the replacement of the subscriber's equipment 500 with subscriber's equipment 501, which is optically connected to optical couplers 210, 230 via optical fibers 205, 225. In effect, in the system shown in FIG. 20, the subscriber's equipment 501 having no redundancy path can be included in the 0th and in the 1st paths.

The subscriber's equipment 501 is provided with a 1×2 optical splitter 530. The 1×2 optical splitter 530 divides an input optical signal from a-point to output signals at $b_0$-point and at $b_1$-point or merges an input signal from $b_0$-point and from $b_1$-point and generates an output signal from a-point. The I/O port of the transceiver 520 is optically connected to the a-point in this 1×2 optical splitter 530, and optical fiber 205 and optical fiber 225 are respectively optically connected to the $b_0$-point and to the $b_1$-point.

The 1×2 optical coupler 530 should be disposed between the transceiver 520 and optical couplers 210, 230, and it is not necessary that it be disposed within the subscriber's equipment 501. For example, the optical splitter 530 can be disposed in the vicinity of optical couplers 210, 230; however, in such a configuration, a long optical fiber is required to span the long distance between the optical splitter 530 and the subscriber's equipment 501. Such a configuration is contrary to the basic objective of improving the reliability of the communication system. It is also desirable from the viewpoint of ease of maintenance that the optical splitter 530 be disposed within the subscriber's equipment 501 as in this embodiment.

Because of the features described above, the 0th path of the optical communication network of this embodiment comprises: the transceiver 110 of the central office equipment 100; optical fiber 200; optical coupler 210; optical fibers 201, 202, 205; transceivers 310, 410; the optical path connecting $b_0$-point and a-point in the optical splitter 530 in the subscriber's equipment 501, and the transceiver 520.

The 1st path of the optical communication network of this embodiment comprises: the transceiver 120 of the central office equipment 100; optical fiber 220; optical coupler 230; optical fibers 221, 222, 225; transceivers 320, 420; the optical path connecting $b_1$-point and a-point in the optical coupler 530 in the subscriber's equipment 501, and the transceiver 520.

As can be seen clearly in the above configuration, the transceiver 520 of the subscriber's equipment 501 is included in both 0th and 1st paths. Therefore, the transceiver 520 is able to communicate with the transceivers 110, 120 in the central office equipment 100.

Under normal operation, communication is carried out in the 0th path. The transceivers 120, 320 and 420 in the 1st path in inoperative, and communication is shut down in the 1st path. Even in the conventional system, non-use systems are shut down for economic reasons, and shutting down is not novel. The reason for shutting down the non-use path in this embodiment is not because of the economy but to prevent merging of the 0th and 1st path signals at the transceiver 520 and to avoid the consequent difficulty in signal reception. Therefore, the central office equipment 100 is designed so that the transceiver in the path to be opened becomes active only after the transceiver in the path to be closed had become inactive. It should be noted that the configuration permits U-signal input, without any restriction, simultaneously from the subscriber's equipment 501 to the transceivers 110, 120 of the central office equipment 100.

As described above, in the network using the 0th path, the transceiver 520 operates only as a component in the 0th path, therefore, the quality of communication is carried out in accordance with FIG. 1. Here, let us assume for example that a problem has developed in the transceiver 310 of the subscriber's equipment 300, and the communication path has been forced to switch from the 0th path over to the 1st path. In this case, the central office equipment 100, subscriber's equipment 300, 400 stop the operation of the corresponding transceivers 110, 310 and 410 in the 0th path, and starts the operation of the transceivers 120, 320 and 420. When the path is changed from the 0th to the 1st path, the transceiver 520 operates only as a component in the 1st path. Therefore, the switching operation does not involve active participation of the transceiver 520, and there is no effect of switching of the communication path from the 0th to the 1st path in the network.

As explained above, in the system of this embodiment, the subscriber's equipment 501 is able to continue its operation without being aware of the fact that the communication path has been switched over, despite the fact that it is not provide with a redundancy path. Therefore, excepting the cases of a critical problem involving its own system (for example, problems in transceiver 520 or in optical coupler 530) or involving the entire system, the user having the equipment 501 is able to continue to receive communication services.

It should be noted that the concept shown in this embodiment can be applied to the point-to-multipoint network shown in FIGS. 4 and 6 to include a subscriber who does not have a redundancy path in the embodiments shown in FIGS. 4 and 6.

Further, it should be noted that although bidirectional couplers were used in the fourth to seventh embodiments presented above, it is permissible to use a unidirectional coupler as in the first embodiment.

Further, in each of the above embodiments, the number of subscribers was chosen to be two or three for simplicity of explanation. It is obvious that more than four subscribers or a configuration of one central office equipment to one subscriber's equipment can be easily accommodated within the concept explained in the present invention.

The network configuration and the components used in the various embodiments are not meant to be restrictive, but illustrative of the concept of providing a cost efficient and high performance optical communication system incorporating the switching system of the present invention.

What is claimed is:

1. An interactive optical communication system providing point-to-multipoint communication services through optical signal path means distributed in an optical network, said system comprising:

central office communication means including: a plurality of office transceiver means for sending and receiving optical signals, the office transceiver means receiving optical signals during a signal receiving time period assigned to the plurality of subscriber transceiver means; and office selection means for selecting, during the signal receiving time period, an optical signal among a plurality of optical signals received in said transceiver means;

a plurality of subscriber communication means, at least two of said subscriber communication means include: a subscriber transceiver means for sending and receiving optical signals oppositely associated with said central office communication means, the signals sent by the subscriber transceiver means being time division multiplexed; and subscriber selection means for selecting one of the subscriber transceiver means among said plurality of subscriber transceiver means;

a plurality of office signal path means, each of said office signal path means includes an office end and an opposing subscriber end, for providing optical paths in said optical network, wherein said office end is optically connected to one of said plurality of office transceiver means in said central office communication means;

a plurality of subscriber signal path means, each of said subscriber signal path means includes a subscriber end and an opposing office end, for providing optical paths in said optical network, wherein said subscriber end is optically connected to one of said plurality of subscriber transceiver means of said plurality of subscriber communication means;

a plurality of optical connection means for merging and splitting signals sent between said subscriber end of said plurality of office signal path means and said office end of said plurality of subscriber signal path means;

wherein said central office communication means selectively reconfigures said office communication paths depending upon a location of a detected signal path failure.

2. A system as claimed in claim 1, wherein said central office communication means comprise:

an office switching means for selecting one office transceiver means from said plurality of office transceiver means for enabling to perform communication, and an office control means for controlling switching operations of said office switching means;

each of said subscriber communication means comprises:

a subscriber switching means for selecting one subscriber transceiver means from said plurality of subscriber transceiver means for enabling to perform communication, and a subscriber control means for controlling switching operations of said subscriber switching means;

wherein said office control means controls said office switching means so as to switch an active office transceiver means to another operative office transceiver means when a malfunction develops in an operating office transceiver means or in optical path means associated with said malfunctioning transceiver means, and said subscriber control means controls said subscriber switching means so as to switch an active subscriber transceiver means to another operative subscriber transceiver means when a malfunction develops in an operating subscriber transceiver means or in optical path means associated with said malfunctioning transceiver means.

3. A system as claimed in claim 1, wherein said optical path means comprise p channels of optical path means carrying multiplexed signals, wherein p represents an integer larger than 2, corresponds with p number of optical coupling means; and at least one of said plurality of subscriber communication means comprise q pieces of subscriber transceiver means wherein q is an integer less than p, and a plurality of qxp optical splitter in each of said subscriber transceiver means, wherein said q pieces of subscriber transceivers and p channels of optical path means are optically connected via said plurality qxp optical splitter.

4. A system as claimed in claim 1, wherein each of said subscriber transceiver means is provided with a signal transmitter and a signal receiver, and each of said plurality of subscriber communication means is provided with a signal switching means for switching a signal transmitter in said subscriber transceiver means for inputting optical signals to said central office communication means.

5. A system as claimed in claim 4, wherein said office selection means produces a logic sum of signals received in said plurality of office transceiver means.

6. A system as claimed in claim 4, wherein said subscriber selection means provided in each of said subscriber communication means detects signal errors in optical signals received by subscriber transceivers, and selects error-free or an optical signal having the least number of errors.

7. A system as claimed in claim 4, wherein said signal switching means provided in each of said subscriber communication means inputs signals into a transmitter of normally functioning subscriber transceiver means upon detecting a malfunctioning signal transmitter in said plurality of subscriber transceiver means.

8. A system as claimed in claim 7, wherein said signal switching means detects a malfunctioning signal transmitter in accordance with output signals from a monitoring photodiode formed integrally within said signal transmitter.

9. A system as claimed in claim 1, wherein optical connection is provided by a plurality of optical coupling means for merging and splitting optical signals and mutual connection means for optically connecting said merged or split signals with said central office transceiver means in said central office communication means.

10. A system as claimed in claim 9, wherein said mutual connection means merge or split optical signals supplied from said plurality of central office transceiver means, and supply merged or split optical signals to said plurality of coupling means, and optical signals outputted from said plurality of coupling means are merged or split and are forwarded to said plurality of office transceiver means.

11. A system as claimed in claim 9, wherein said mutual connection means merge optical signals supplied from said plurality of office transceiver means, and supply merged optical signals to said plurality of coupling means, and optical signals outputted from said plurality of coupling means are merged and are forwarded to said plurality of office transceiver means.

12. A system as claimed in claim 9, wherein one of said plurality of coupling means is provided with a subscriber communication means having one subscriber transceiver means.

13. A system as claimed in one of claims 1, 5, 6, 8, 10, 11, 12, 2 or 3, wherein each of said office transceiver means and said subscriber transceiver means comprises a signal transmitter and a signal receiver; wherein said office transceiver means or subscriber transceiver means optically connects a signal transmitter provided in each of said plurality of subscriber communication means with a signal receiver provided in said central office communication means via one of said optical connection means, and said transceiver means optically connects a signal transmitter provided in said central office communication means with each signal receiver provided in each of said plurality of subscriber communication means via said one optical connection means.

* * * * *